United States Patent
Teyhan et al.

(10) Patent No.: US 12,508,626 B2
(45) Date of Patent: Dec. 30, 2025

(54) EXCITER WITH SEPARATE HOUSING AND MOUNTING PLATE

(71) Applicant: SANDVIK ROCK PROCESSING AUSTRALIA PTY LIMITED, New South Wales (AU)

(72) Inventors: Douglas Robert Teyhan, New South Wales (AU); Tim Stanton Cook, New South Wales (AU); Andreas Wieltsch, New South Wales (AU); Simon Mann, New South Wales (AU)

(73) Assignee: Sandvik Rock Processing Australia Pty Limited, New South Wales (AU)

( * ) Notice: Subject to any disclaimer, the term of this patent is extended or adjusted under 35 U.S.C. 154(b) by 0 days.

(21) Appl. No.: 18/694,391

(22) PCT Filed: Sep. 21, 2022

(86) PCT No.: PCT/AU2022/051137
§ 371 (c)(1),
(2) Date: Mar. 21, 2024

(87) PCT Pub. No.: WO2023/044531
PCT Pub. Date: Mar. 30, 2023

(65) Prior Publication Data
US 2024/0390940 A1 Nov. 28, 2024

(30) Foreign Application Priority Data

Sep. 22, 2021 (AU) .............................. 2021903046

(51) Int. Cl.
*B06B 1/16* (2006.01)
*B65G 27/16* (2006.01)
(Continued)

(52) U.S. Cl.
CPC ................ *B06B 1/167* (2013.01); *B06B 1/16* (2013.01); *B65G 27/16* (2013.01); *F16C 23/06* (2013.01);
(Continued)

(58) Field of Classification Search
CPC ........... B06B 1/167; B06B 1/16; B06B 1/162; B65G 27/16; B65G 27/20; B65G 27/32;
(Continued)

(56) References Cited

U.S. PATENT DOCUMENTS

| 4,928,551 A | 5/1990 | Connelly et al. |
| 11,623,249 B2 | 4/2023 | Kato et al. |

(Continued)

FOREIGN PATENT DOCUMENTS

| AU | 2014201607 B2 | 11/2015 |
| CN | 201618682 U | 11/2010 |

(Continued)

OTHER PUBLICATIONS

"Five Ways to Keep Roller Bearings Cool", MachineDesign, Jul. 13, 2016, [retrieved from internet on Nov. 2, 2022] Retrieved from https://www.machinedesign.com/mechanical-motion-systems/bearings/article/2182080/five-ways-to-keep-roller-bearings-cool.

(Continued)

*Primary Examiner* — Jacob S. Scott
*Assistant Examiner* — Miraj T. Patel
(74) *Attorney, Agent, or Firm* — Corinne R. Gorski

(57) ABSTRACT

A vibration exciter apparatus includes an exciter housing and at least one bearing means supporting at least one driven shaft carrying eccentric mass means. The exciter housing has an array of bore passages extending from an upper wall of the exciter housing to a lower wall of the exciter housing and a mounting structure plate securable to mineral processing or handling equipment intended to be vibrated by the (Continued)

exciter apparatus. The mounting structure plate includes an array of fastener receiving zones, whereby elongated fastener means can pass through the bore passages from the upper wall to be engaged in the fastener receiving zones.

35 Claims, 13 Drawing Sheets

(51) Int. Cl.

| | | |
|---|---|---|
| F16C 23/06 | (2006.01) | |
| F16C 33/66 | (2006.01) | |
| F16H 57/02 | (2012.01) | |
| F16H 57/021 | (2012.01) | |
| F16H 57/04 | (2010.01) | |
| H02K 7/06 | (2006.01) | |
| H02K 7/08 | (2006.01) | |
| H02K 7/116 | (2006.01) | |

(52) U.S. Cl.
CPC ....... *F16C 33/6659* (2013.01); *F16H 57/021* (2013.01); *F16H 57/0404* (2013.01); *F16H 57/0416* (2013.01); *F16H 57/0417* (2013.01); *F16H 57/0449* (2013.01); *F16H 57/045* (2013.01); *F16H 57/0457* (2013.01); *F16H 57/0471* (2013.01); *F16H 57/0495* (2013.01); *H02K 7/061* (2013.01); *H02K 7/08* (2013.01); *H02K 7/116* (2013.01); *F16C 2300/28* (2013.01); *F16H 2057/02073* (2013.01)

(58) Field of Classification Search
CPC .. F16C 23/06; F16C 33/6659; F16C 2300/28; F16H 57/0416; F16H 57/0417; F16H 57/045; F16H 57/0457; F16H 57/0471; F16H 57/0495; F16H 57/0453; F16H 57/021; F16H 2057/02073; F16H 57/0452; H02K 7/061; H02K 5/20; H02K 7/20; H02K 7/063; H02K 9/19; H02K 7/065; H02K 9/06; H02K 9/08; F16N 7/26

See application file for complete search history.

(56) References Cited

U.S. PATENT DOCUMENTS

| | | | |
|---|---|---|---|
| 2004/0045877 | A1 | 3/2004 | Rubie et al. |
| 2014/0190791 | A1* | 7/2014 | Kimura ............. B06B 1/0603 198/348 |
| 2014/0341675 | A1 | 11/2014 | Dobbin |
| 2017/0066017 | A1 | 3/2017 | Ashley et al. |
| 2018/0128154 | A1 | 5/2018 | Heeszel et al. |
| 2019/0323546 | A1 | 10/2019 | Stevens et al. |
| 2020/0049188 | A1 | 2/2020 | Rawdon et al. |

FOREIGN PATENT DOCUMENTS

| | | |
|---|---|---|
| CN | 109127345 A | 1/2019 |
| CN | 211202567 U | 8/2020 |
| CN | 112610871 A | 4/2021 |
| EP | 0841264 B1 | 2/2001 |
| EP | 3171042 A1 | 5/2017 |
| FR | 2529292 A1 | 12/1983 |
| GB | 547076 A | 8/1942 |
| JP | 2748708 B2 | 5/1998 |
| WO | 2015084467 A2 | 6/2015 |
| WO | 2017016665 A1 | 2/2017 |

OTHER PUBLICATIONS

"Lubrication of Roller Bearings," Schaeffler Technologies, published Mar. 2013. [retrieved from internet on Nov. 2, 2022] Retrieved from https://www.schaeffler.com/remotemedien/media/shared media/ 08 media library/01 publications/schaeffler 2/tpi/downloads 8/tpi176 de en.pdf.

* cited by examiner

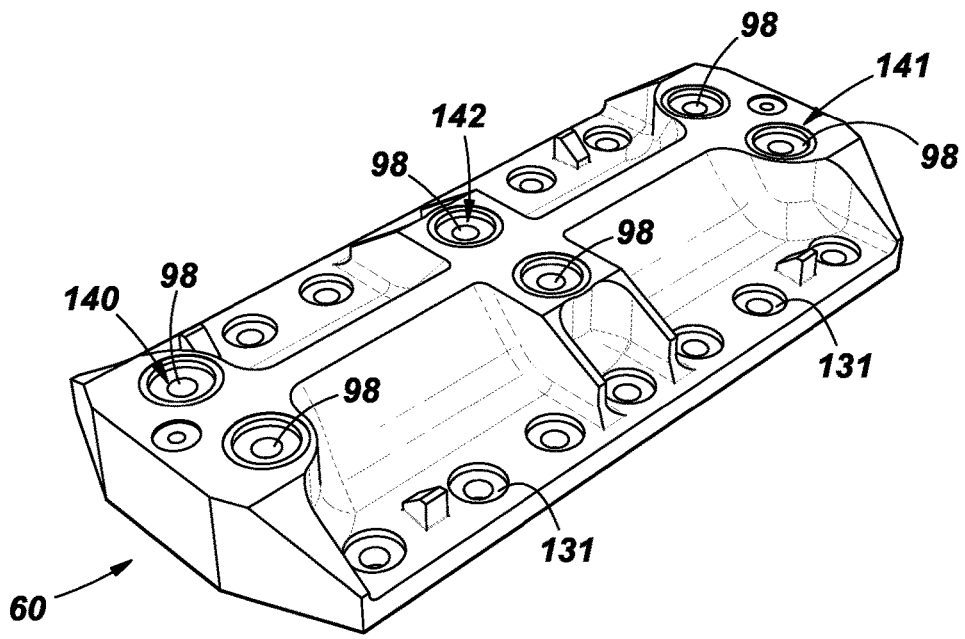
FIGURE 18
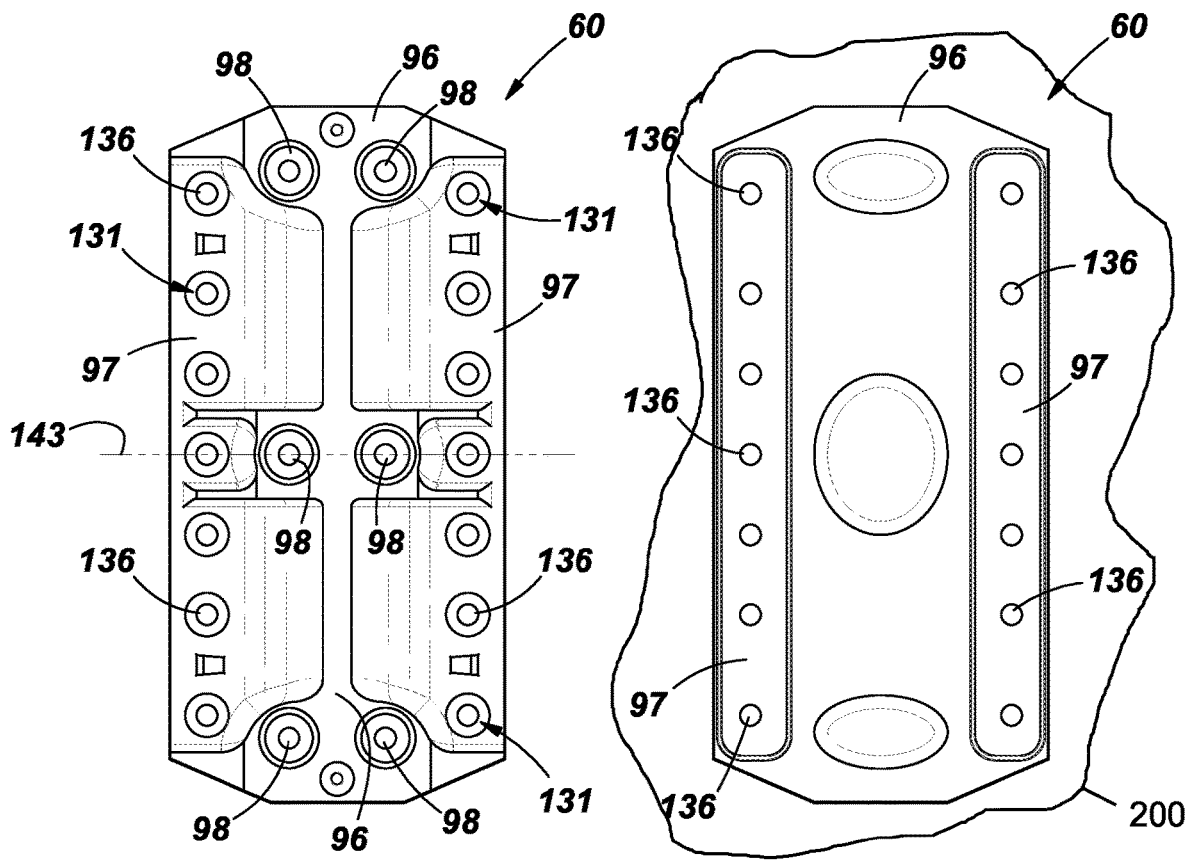
FIGURE 19
FIGURE 20

EXCITER WITH SEPARATE HOUSING AND MOUNTING PLATE

RELATED APPLICATION DATA

This application is a § 371 National Stage Application of PCT International Application No. PCT/AU2022/051137 filed Sep. 21, 2022 claiming priority to AU 2021903046 filed Sep. 22, 2021. This application is related to co-pending U.S. patent applicaton Ser. No. 18/694,401, filed on Mar. 21, 2024 and Ser. No. 18/694,403 filed on Mar. 21, 2024.

FIELD OF THE INVENTION

This disclosure relates to exciter apparats and parts thereof, the exciter apparatus, either alone or in combination with other similar devices, being intended to impose a vibration regime to mineral processing or handling equipment during use of such equipment. While mineral processing or handling applications such as mining ore, coal and quarrying activities are relevant, other comparable applications are possible and are also applicable to this development.

BACKGROUND OF THE INVENTION

Exciter apparatus for imposing a vibration regime to mineral processing or handling equipment of various designs and configurations are known. One such apparatus is a series of exciters identified by reference serial numbers DF6xx provided by "Schenck Process". Similar exciter apparatus is also provided by various other entities. Typical features of DF6xx series exciter apparatus are illustrated in FIGS. 1 to 4 annexed hereto and are described in greater detail in the following text. The prior art vibration exciter apparatus 10 includes a cast exciter housing 11 with opposed side walls 12, 13, opposed end walls 14, 15, and a closed base wall. The upper face of the cast exciter housing 11 is substantially open with a surrounding seal flange 16, the upper face being closed when assembled by a top wall plate 17, a seal gasket 18 and a plurality of fasteners 19. Each of the side walls 12, 13 have adjacent openings 20, 21 to allow a long driven shaft 22 and a short driven shaft 23 to project there through in the assembled structure (FIG. 1). In this assembled structure, the outer ends of the shafts 22, 23 carry eccentric masses 24 with the arrangement of the masses 24 being overlapping as shown in FIG. 1. Each of the openings 20, 21 in the side walls 12, 13 are closed in the assembled structure (FIG. 1) by closure plates 25, 26 that are sealed to the side walls 12, 13 and include seals that seal on the driven shafts 22, 23. The driven shafts 22, 23 are carried by bearings 27 which typically are a pair of spherical roller bearings (SRB) positioned on each shaft 22, 23. As shown in FIG. 4, a pair of intermeshing gears 28 are mounted on each driven shaft 22, 23 where the intermeshing gears 28 are axially positioned between the bearings 27 on each driven shaft 22 or 23. The interior of the exciter housing 11, in its lower regions, provides a liquid lubricant zone or sump 29 with the liquid lubricant being introduced through an upper inlet opening 30 and drained through a lower drain opening 31 when required. When in use, the inlet opening 30 and lower drain opening 31 are closed by removable plugs or stopper members. Each of the four bearings 27 and the intermeshing gears 28 are intended to be splash lubricated from the lubricant in the common sump 29.

The exciter housing 11 has a lower outwardly extending flange 32 with a plurality of fastener (bolt) receiving bores 33 along their lengths to allow fastener bolts or the like to secure the exciter apparatus 10 to the desired position on processing or handling equipment, typically mineral processing or handling equipment. The outwardly extending flanges 32 may be strengthened or stiffened by vertical webs 34, however, such webs tend to make it difficult to rotate the fastener bolts (or similar) when installing or removing the exciter apparatus.

The driven shafts 22, 23, in use, are drivingly connected to a drive motor or motors to rotate the eccentric masses 24 to create the desired vibration regime. Various arrangements for achieving this are known including, but not limited to, a drive motor driving each shaft, a drive motor driving one shaft with rotation being drivingly transferred to the other shaft by gearing means including the inter meshing gears shown in FIG. 4. Exciter apparatus utilising one driven shaft or more than two driven shafts are known and some aspects of the developments disclosed in the following specification will be recognised as applying to such exciter apparatus. Drive arrangements for the or each driven shaft are known and therefore are not further shown or described in the following.

Several other published prior art references are briefly discussed in the following. Chinese patent specification no CN112610871A has a housing constructed similarly to that described above in relation to the DF6xx series exciter housing except that the bearings supporting the driven shafts are not lubricated by splash lubrication from a sump containing liquid lubricant but rather by a pump and delivery passages delivering liquid lubricant to the bearings, presumably to try to improve bearing lubrication. The specification discloses intermeshing gears, only one of which is drivingly carried by one of the driven shafts with the other directly driving the aforesaid pump. Intermeshing gears carried by both driven shafts are not shown. Australian Patent Specification No 2014201607A1 discloses exciter apparatus having a casing or housing similarly constructed to the above described DF6xx series exciter apparatus except that it positively defines that no intermeshing gearing mounted from the driven shafts are shown or intended to be used. The internal space of the housing does have two separate liquid lubricant sump zones for the respective shaft bearings formed by an intermediary wall.

The above discussed DF6xx series exciter apparatus 10 and similar exciter apparatus from other sources are generally fixed to the processing or handling apparatus intended to be vibrated by using relatively standard fasteners at a base level of the exciter apparatus. Generally, the fasteners are relatively short passing through a flange at the base of the exciter apparatus. They are subjected to high dynamic loads and are susceptible to breakage when tightening has not been completed correctly. The arrangement of these connection fasteners at a base level of the exciter apparatus often requires the eccentric masses to be rotated and supported and installation or removal personnel to get underneath the exciter apparatus to tighten or loosen the multiple fastener bolts. This is not a particularly ergonomic task and can also be a hazardous operation. A still further issue with the configuration of current designs of exciter apparatus is that a completely different and complex exciter apparatus casing needs to be produced each time the connection pattern of fastener bolts changes. More particularly, if replacement exciter apparatus is to be used on processing or handling equipment constructed for some other exciter apparatus design, then either the complete exciter housing has to be redesigned or the processing or handling equipment has to be modified. In known exciter apparatus it is also reasonably common to utilise alignment pins or the like to try to ensure the exciter apparatus is correctly positioned or aligned. Such means are often not used, or not correctly used, during installation on site.

Furthermore, in the above discussed existing design arrangements, it is commonplace to provide dynamic guard shields protectively encasing the eccentric masses 24 carried by the driven shafts 22, 23. Such dynamic guard shields are generally mounted to the exciter casing or parts thereof by multiple fastener elements, the guard shields generally obstructing access to the fasteners securing the exciter casing to the processing or handling equipment. Thus, if the exciter apparatus is to be removed, for any reason, generally the dynamic guard shields will also need to be removed, which is a reasonably time consuming task.

Furthermore, the above discussed vibration exciters and similarly constructed exciters utilising intermeshing gears are typically mounted to mineral processing or handling equipment such as vibrating screening apparatus for separating mined ore material into sized particle ranges and feeders therefore in a variety of positions and angles of inclination including at least partially inverted positions. These exciters typically use a splash lubrication system where a lubricating liquid bath is provided in a single sump contained within the exciter housing with the lower gear, given the orientation of the exciter housing, engages the lubricating liquid and splashes same onto the various moving parts including the bearings and the other intermeshing gear. There is, however, believed to be some shortcomings with this existing arrangement. Specifically, at start up, and with some viscosity characteristics of the lubricating liquid, there may not be sufficient lubricating liquid getting operationally to the bearings and particularly the bearing(s) located furthest from the liquid lubricant bath. It may, for example, be desirable to have different lubricating characteristics for the bearings compared to the gears, particularly at start up, but this is not possible with a single sump exciter housing that must provide the same lubricating liquid for the bearings and the gears.

Current DF6xx series exciter apparatus from Schenck Process and other similar apparatus rely exclusively on natural convective cooling from external surfaces of the exciter apparatus. This results in relatively high operating temperatures, particularly around the bearings. These high temperatures result in the condition of the liquid lubricant deteriorating relatively quickly. The high temperatures also limit the life of elastomeric seals such as lip or V-ring seals. Current exciter apparatus commonly utilise felt seals, particularly to seal rotating shafts, however these seal types are not fully airtight and may allow leakage or ingress of damaging debris particles or water which can accumulate over time. Generally it would be desirable to use elastomeric sealing members but to do so, operating temperatures need to be significantly reduced. In this regard, relying on current convective cooling effects would not be sufficient.

Exciter apparatus normally operate in relatively harsh environments and while the internal zones are sealed, at least to some extent, it is possible for small amounts of externally originating particle debris or water to enter the internal spaces. Moreover, the harsh operating characteristics of exciter apparatus does cause metal wear particles to be formed over a period of use which also collect in internal zones. Such particle material can have significant adverse life effects on the internal moving parts and particularly the bearings. Exciter apparatus of the aforedescribed type have generally become larger over time producing higher magnitudes of force, and as a result, they tend to run hotter due to higher friction associated with larger bearings being used. This circumstance provides significant complications for selecting a lubricating liquid with a suitable viscosity characteristic, that is, low enough at start up but high enough to provide adequate lubrication and resistance against contaminants during normal or continuous operation. Moreover, if during a maintenance stage, lubricating liquid is introduced with incorrect lubricating characteristics, then this can have a significant adverse effect on operational life. Further, known vibration exciter apparatus either have no live (that is, during operation) method of sensing lubrication liquid levels in lubricating liquid sumps, or have basic lubricating liquid level sensing methods such as the use of dipsticks that are operational only when the vibration exciter apparatus is not in operational use. Still further, such liquid level sensing methods that do exist, can be affected by issues associated with installation configurations of such vibration exciter apparatus.

Some of the foregoing factors and others have resulted in exciter apparatus, particularly those used in harsh environments such as mine sites and the like, to ideally require relatively short period maintenance operations to be carried out on site by available site based maintenance personnel. At the same time, mine operators have been moving away from employing site-based maintenance employees for carrying out such maintenance operations. Moreover, regular relatively short period onsite maintenance operations tend to provide unwanted and non-productive shutdown, or at least partial shutdown of potentially high income earning activities which is generally not desired. It is therefore recognised that longer periods between requiring any maintenance activities would be desirable, and particularly, it would be desirable to have a bolt in, bolt out replacement process whereby maintenance and/or renovation of such exciter apparatus might occur offsite by personnel experienced in such specialised activities.

Generally, in the design of vibrational processing or handling equipment it is conventional current practice to install vibration exciter apparatus in differing positions and locations including, in some cases, underslung positions where they might be inverted. It is also relatively common practice to have a variety of differing fastener securing numbers and arrays meaning, in most instances, that a vibration exciter apparatus is designed and manufactured to fit and be installed in a particular position on, a particular vibrational processing or handling equipment. This results in substantially higher costs of supply of vibrational exciter apparatus than would be expected if a uniform or standard design of vibration exciter could be used.

BRIEF SUMMARY OF THE INVENTION

One preferred objective of the present development is to provide improvements in exciter apparatus, or in parts thereof, that will enable an improvement in periods between which regular maintenance activities might be carried out. A further preferred objective is to provide improvements in the design of exciter apparatus, or in parts thereof, that will allow ease of installation, or removal of exciter apparatus from vibration processing or handling equipment requiring vibration during use. The latter objective being to also assist with maintenance activities when required, and to provide a possibility of providing a bolt in, bolt out, replacement process, if an external offsite renovation/maintenance program is to be followed. A still further preferred objective is to provide improvements in vibration exciter apparatus that will enable a standard design of vibration exciter apparatus to be installed on processing or handling equipment that may have had a variety of fastener receiving locations for differing forms of vibration exciter apparatus.

According to the first aspect of this development, a vibration exciter apparatus being, in use, mountable to vibration processing or handling equipment to impose a vibration regime to said vibration processing or handling equipment, said vibration exciter apparatus having an exciter housing with a base wall portion, two opposed end wall portions extending upwardly from opposed end zones of said base wall portion and having an upper face and two opposed side faces together defining an internal zone, said exciter housing further having a plurality of spaced first fastener positioning locations positioned at or adjacent said upper face configured in a first array, said exciter housing also having a plurality of spaced second fastener positioning locations positioned at or adjacent said base wall portion in a second array, whereby at least one of said first array of said first fastener positioning locations and/or said second array of said second fastener positioning locations co-operate with multiple fastener elements to secure said vibrational exciter apparatus in an operational position of use to said vibration processing or handling equipment with selectably either said upper face or said base wall portion positioned relatively closer to said vibration processing or handling equipment.

Preferably, the first array of said first fastener positioning locations are aligned with the second array of said second fastener positioning locations whereby a said fastener element or multiple said fastener elements pass through both a said first fastener positioning location and a said second fastener positioning location when said vibration exciter apparatus is secured to said vibration processing or handling equipment. Alternatively, a said fastener element or multiple said fastener elements may pass through only one of a said first fastener positioning location or a said second fastener positioning location.

In a potentially further possibility, it is anticipated that a combination of short fastener elements passing through only one of the first or the second fastener positioning locations, and longer fastener elements that, in each instance, pass through a said first and a said second fastener positioning location to locate either the upper wall portion or the lower wall portion adjacent to the vibration processing or handling equipment. The first fastener positioning locations may be formed in flange parts extending from the upper wall portion with the second fastener positioning locations being potentially formed in flange parts extending from the lower wall portion. The first and the second fastener positioning locations may be bores formed in the aforesaid flange parts and may or may not be aligned depending on whether elongated fastener elements passing through at least some of both the first and the second fastener receiving locations will be used.

In accordance with a further aspect of this development, vibration exciter apparatus is provided configured, in use, to impose a desired vibration regime to vibration processing or handling equipment, said vibration exciter apparatus including an exciter housing having an upper wall portion, an opposed lower wall portion spaced from said upper wall portion, said lower wall portion and said upper wall portion being connected by two opposed mutually spaced end wall portions, said exciter housing having two spaced and opposed side faces, said exciter housing further having a plurality of spaced fastener positioning locations, each said fastener positioning location having at least a first portion positioned at or adjacent an upper face of the upper wall portion of the exciter housing and a second portion aligned with said first portion located at or adjacent a lower face of the lower wall portion of the exciter housing, and a plurality of elongated fastener elements each having a length to pass through said aligned first and second portions of a said fastener positioning location and being cooperable with at least some of said fastener positioning locations to, in use, mount said vibration exciter apparatus to said vibration processing or handling equipment with selectably either said upper wall portion or said lower wall portion of said exciter housing being relatively closer to or spaced from said vibration processing or handling equipment.

In one possible embodiment, the vibration exciter is configured to include fastening formation means located at one end of each said elongated fastener element engages directly into a pre-existing mounting region of said processing or handling equipment. Alternatively the vibration exciter apparatus may include a separate plate mounting structure cooperable with said exciter housing and being secured or securable to said processing or handling equipment, said separate plate mounting structure including multiple spaced fastener receiving fitting means positioned whereby a said first portion or a said second portion of a respective said fastener positioning location cooperates with a said fastener receiving fitting means of said separate plate mounting structure. Preferably an upper face of the upper wall portion and a lower face of the lower wall portion include exciter housing engagement formation means cooperable with the mounting plate structure engagement formation means to relatively locate said fastener positioning locations with said fastener receiving fitting means of said mounting plate structure. Conveniently, the exciter housing engagement formation means and said mounting plate structure engagement formation means include cooperable aligning surface arrangements to ensure alignment of a fastener positioning location of said exciter housing with a said fastener receiving fitting means of said mounting plate structure.

Providing the aforesaid fastener positioning arrangements that enable either the upper wall portion or the lower wall portion of the exciter housing to be located nearer to or further away from the vibration processing or handling equipment when mounted thereto, that is either to an upwardly facing or a downwardly facing part of the vibration processing or handling equipment, enables the usage of a standard or uniform designed exciter casing in a variety of locations and orientations. That is separate exciter housing design configurations do not need to be manufactured for a variety of usage positions. The vibration exciter housing can be inclined in different directions and different orientations without altering the effective working of the internal structures of the vibration exciter apparatus. Further, the use of elongated fastener elements as outlined in some aspects of this development in the foregoing and in later description enables installation and removal (when required) of the fastener elements easily without obstruction by strengthening webs or other parts of known exciter housing parts as described above.

In one preferred aspect, the fastener positioning locations are arranged in an array whereby the fastener positioning locations located at one end of the exciter housing relative to a central transverse axis form a mirror image of the fastener positioning locations at an opposed end of the exciter housing relative to the central transverse axis. This provides the flexibility of being able to reorientate the position of the endwall positions of the exciter housing if this seems necessary in a particular installation location, particularly to maintain liquid lubricant sump(s) in a desired operational position.

Conveniently, the exciter housing may include an internal zone mounting at least one bearing means, the or each said bearing means supporting a driven shaft carrying eccentric mass means externally of said exciter housing.

Preferably the internal zone of said exciter housing includes an individual liquid lubricant sump zone for the or each said bearing means.

The or each said bearing means may include a first bearing member and a second bearing member positioned axially along a said driven shaft. Preferably the first bearing member is a toroidal roller bearing and the second bearing member is a spherical roller bearing.

In a particularly preferred aspect, a first said bearing means carrying a first said driven shaft is located in said internal zone adjacent a first said end wall portion of said exciter housing and a second said bearing means carrying a second driven shaft is located in said internal zone adjacent a second said end wall portion, said first bearing means being located in said internal zone in a first said liquid lubricant sump zone, and said second bearing means being located in said internal zone in a second said liquid lubricant sump zone separate from said first liquid lubricant sump zone, said first liquid lubricant sump zone and said second liquid lubricant sump zone being positioned adjacent a first said side face of the exciter housing. Preferably, the first driven shaft and the second driven shaft also each carry gear means intermeshing with each other, said intermeshing gear means being located in a third liquid lubricant sump zone separate from said first and said second liquid lubricant sump zones and positioned between said first and said second liquid lubricant sump zones and a second said side face of said exciter housing.

In a further preferred aspect, the present development provides a vibration exciter apparatus being, in use, mountable to vibration processing or handling equipment, said exciter apparatus having an exciter housing with an upper wall, a lower wall, opposed end walls, and opposed side faces defining an internal zone operationally supporting spaced bearing means, said exciter apparatus further having spaced first and second driven shafts each being supported by a respective said bearing means whereby an end portion of each of said first driven shaft and said second driven shaft extends beyond a side face of said exciter housing and carries eccentric mass means, said exciter apparatus still further including a mounting plate structure separate to said exciter housing and securable, in use, to said vibration processing or handling equipment, said exciter housing having multiple spaced fastener receiving bore means extending through said exciter housing from a first end zone at or adjacent said upper wall of said exciter housing part to a second end zone at or adjacent said lower wall of said exciter housing, said mounting plate structure including multiple spaced fastener receiving fitting means positioned whereby a said first end zone, or a said second end zone of respective said fastener receiving bore means are alignable with a said fastener receiving fitting means in said mounting plate structure. The fastener receiving bore means may be continuous or discontinuous.

In a still further preferred aspect, the present development provides a vibration exciter apparatus casing for use in vibration exciter apparatus intended, in use, to be mounted to vibration processing or handling equipment to impose a vibration regime to said vibration processing or handling equipment, said vibration exciter apparatus casing having an upper wall portion, a lower wall portion spaced from said upper wall portion being connected by two opposed mutually spaced end wall portions, said vibration exciter apparatus casing further having two opposed side faces, said vibration exciter apparatus casing further having a plurality of spaced fastener positioning locations, each said fastener positioning location having at least a first portion positioned at or adjacent an upper face of the upper wall portion of the vibration exciter apparatus casing and at least a second portion located at or adjacent a lower face of the lower wall portion of the vibration exciter apparatus casing, whereby said vibration exciter apparatus casing, when forming part of vibration exciter apparatus, is mountable to said vibration processing or handling equipment by elongated fastener elements with selectably either said upper face or said lower face of said vibration exciter apparatus casing being relatively closer to or spaced from said vibration processing or handling equipment. Conveniently, each said end wall portion has at least two spaced fastener receivable bore means each forming a said fastener positioning location. Preferably, at least one said fastener positioning location is formed in said vibration exciter apparatus casing midway between said end wall portions. One or more of the aforesaid fastener positioning locations may include a continuous bore passage extending from a said first portion to a said second portion. In a possible alternative embodiment, one or more of said fastener positioning locations may include a first bore passage extending inwardly from a said first portion and a second bore passage axially aligned with said first bore passage extending inwardly from said second portion, said first bore passage and said second bore passage being axially spaced from one another.

In yet another preferred aspect, the vibration exciter casing may have an internal zone within the upper wall portion, the lower wall portion, and the opposed spaced end wall portions, at least one of the side faces being substantially open. Preferably, at least one bearing mounting compartment is formed in said internal zone adjacent a first said side face portion, the or each said bearing mounting compartment including wall formation means engageable, in use, with one or more bearing means. Conveniently, the or each said bearing mounting compartment includes at least one liquid lubricant sump zone positioned adjacent said wall formation means. The casing may have two said bearing mounting compartments provided in said internal zone in side by side configuration positioned adjacent said first side face and separated by a transversely disposed intermediate wall means, said transversely disposed intermediate wall means extending from said first side face providing two separated said liquid lubrication sump zones. Preferably said two bearing mounting compartments and said intermediate wall means may terminate at a position internally spaced from said second side face opposed to said first side face whereby a gearing mounting compartment is positioned in said internal zone between the or each said bearing mounting compartment(s) and the second side face.

In a still further preferred aspect, the present development provides a vibration exciter apparatus being mountable, in use, to vibration processing or handling equipment to impose a vibration regime to said vibration processing or handling equipment, said vibration exciter apparatus having an exciter housing with a base wall portion, a first end wall portion and a second end wall portion respectively extending upwardly from opposed end zones of said base wall portion, said base wall portion and said first and said second end wall portions defining an internal zone of the exciter housing having an upper face and two opposed side faces, said exciter housing further having a plurality of spaced first fastener positioning locations configured in a first array, said first array having a first end zone and an opposed second end zone, said first fastener positioning locations permitting fastener elements to pass there through to engage with fastener engagement locations in an engagement zone of said vibration processing or handling element, said fastener engagement locations being arranged in a second array, said second array having a first end zone and a second opposed end zone, whereby when mounting said vibration exciter apparatus to said vibration processing or handling equipment, said vibration exciter apparatus is selectably rotatable about an intermediate vertical axis to position either a first end zone of said first array of fastener positioning locations or a second end zone of said first array of fastener positioning locations with a said first end zone of said second array of said fastener engagement locations whereby said fastener elements enable mounting of said vibration exciter apparatus to said vibration handling or processing equipment.

The engagement zone may be part of the vibration processing or handling equipment, either mounting the vibration exciter apparatus in an under slung position or an upright (extending upwardly) position. Alternatively, the engagement zone may be formed by a mounting plate structure separate from said vibration exciter apparatus, said mounting plate structure being secured to or securable to said vibration processing or handling equipment. Such a separate mounting plate structure may include a plurality of fastener element positioning locations arranged in a third array alignable with fastener engagement locations either pre-existing or formed on the vibration processing or handling equipment enabling the mounting plate structure to be mounted thereto.

A further advantage is that the eccentric masses do not need to be rotated to the opposite side of the exciter apparatus in underslung orientation installation, thereby avoiding health and safety risks to the installing personnel.

In yet another preferred aspect, this disclosure may include a vibration exciter assembly being, in use, mountable to vibration processing or handling equipment to impose a desired vibration regime to said processing or handling equipment, said vibration exciter assembly including exciter apparatus having an exciter housing and a mounting plate structure separate to said exciter apparatus, said separate mounting plate structure being securable in a desired mounting position to said processing or handling equipment, said exciter apparatus having a plurality of exciter housing fastener receiving zones disposed in a first array, said mounting plate structure having a plurality of first mounting plate structure fastener receiving zones disposed in a second array whereby at least some of said exciter housing fastener zones are alignable with at least some of said first mounting plate structure receiving zones whereby said exciter apparatus is securable to the mounting plate structure by a plurality of first fastener means each being cooperable with a respective one of said exciter housing fastener receiving zone and a first mounting plate structure fastener receiving zone. Preferably said mounting plate structure includes a plurality of second mounting plate structure fastener receiving zone disposed in a third array configured differently to said second array. The exciter housing may include exciter housing engagement formation means cooperable with mounting plate structure engagement formation means to relatively locate said first array with said second array. Preferably, the exciter housing engagement formation means and the plate structure engagement formation means each including engageable alignment surfaces to align said first array with said second array as the exciter apparatus is moved towards said mounting plate structure.

The present development also provides a method of replacing a first vibration exciter apparatus secured by a plurality of removable first fastener elements to a first installation position on processing or handling equipment whereby, in use, said first vibration exciter apparatus imposes a vibration regime to said processing or handling equipment, said first fastener elements being engaged with first fastener receiving zones disposed in a first array in said first installation position, said method including the steps of: (i) removing said first vibration exciter apparatus from said first installation position; (ii) installing an adapter plate member to said first installation position, said adapter plate member having a plurality of second fastener receiving zones in a second array being alignable with second fastener receiving zones on a second vibration exciter apparatus; and (iii) installing a said second vibration exciter apparatus on said processing or handling equipment by utilising second fastener elements engageable with said second vibration exciter apparatus and into a said second fastener receiving zone in said adapter plate member. Preferably the adapter plate member has a plurality of said second fastener receiving zones arranged in said second array. Conveniently, the adapter plate member may further include a plurality of said third fastener receiving zones arranged to be alignable with said first array of fastener receiving zones in said first installation position, said second array and said first array being different.

The usage of an adapter plate member or structure as described in the foregoing provides a number of significant benefits. Firstly, the adapter plate member or structure is a relatively inexpensive item to manufacture relative to a complete vibration exciter apparatus. As a result, the adapter plate member or structure can enable a standardized vibration exciter apparatus to replace a vibration exciter apparatus of a different design, that is, not a standardized design, when it is desired to do so. The vibration exciter apparatus may include some, a select number, or all of the features described above or hereafter, including those described with reference to prior art designs. Further it can assist with reorientation of the vibration exciter apparatus secured thereto.

According to yet another aspect of this development there is provided a vibration exciter apparatus configured, in use, to impose a vibration regime to vibration processing or handling equipment, said exciter apparatus including an exciter housing, first bearing means and second bearing means positioned in said exciter housing each supporting a driven shaft carrying eccentric mass means externally of said exciter housing, a pair of intermeshing gears, each being carried by a said driven shaft for rotation therewith, a first liquid lubricant sump for a first one of said bearing means located within said exciter housing, a second liquid lubricant sump for a second one of said bearing means located within said exciter housing whereby said second liquid lubricant sump is separate from said first liquid lubricant sump, and a third liquid lubricant sump for said intermeshing gears located within said exciter housing, said third liquid lubricant sump being separate from said first and said second liquid lubricant sumps. This configuration enables the advantages of intermeshing gears connected to the driven shafts with the two bearing means and the intermeshing gears being located in separate liquid lubricant sumps whereby each of the two bearing means and the intermeshing gears can be reliably lubricated from their own individual liquid lubricant sumps. There are a number of other benefits that arise including:

it is possible to have one set of drain points located so that they can always be utilised regardless of the orientation of the exciter apparatus and can be used to fully drain the sump zones to thereby avoid leaving contaminants/debris in the sump zones;

particulate (debris) capture devices can be located in or associated with the individual sump zones to assist with removal of such debris and further to ensure that such capture devices are located always submerged in liquid lubricant;

the liquid lubricant level within the liquid lubricant sump zone(s) remains the same with respect to the distance from the driven shaft axis (or axes), irrespective of mounting orientation and angle of inclination. That is, liquid lubricant can be filled onto the sump zones during factory manufacture and does not need to be adjusted for different installation angles or orientations; and it is possible, because the liquid lubricant surface level is reasonable stable, to have sensor probe means positioned in the liquid lubricant in the sump zone(s) to sense liquid lubricant levels to determine, during use, whether such levels have dropped to a stage where more liquid lubricant needs to be introduced, or if maintenance is required by removing the exciter apparatus and replacing same with a new or factory renovated exciter apparatus.

In a further preferred aspect of this development, an exciter apparatus casing may be provided intended, in use, to form part of vibration exciter apparatus intended to impose a vibration regime to vibration processing or handling equipment, the exciter apparatus casing having substantially continuous wall structure with an upper wall portion, an opposed lower wall portion, two mutually spaced and opposed end wall portions, and two mutually spaced side faces together defining an internal zone, said internal zone including two bearing mounting compartments separated by a transversely disposed intermediate wall structure extending from a first said side face, said internal zone also including a bearing compartment positioned between said intermediate wall structure and a second said side face of the exciter apparatus casing.

Preferably at least one fastener receivable bore passage passes through each said end wall portion and said intermediate wall structure from said upper wall portion to said lower wall portion. Conveniently each said end wall portions and said intermediate wall structure has two or more spaced said fastener receivable bore passages.

According to a still further aspect exciter apparatus may be provided configured, in use, to impose a vibration regime to processing or handling equipment, said exciter apparatus including an exciter housing, first bearing means and second bearing means positioned in said exciter housing supporting two spaced driven shafts each carrying eccentric mass means externally of said exciter housing, each of said first bearing means and said second bearing means including at least a spherical roller bearing and a toroidal roller bearing axially disposed along a respective one of said driven shafts.

In yet another preferred aspect, exciter apparatus may be provided configured, in use, to impose a vibration regime to processing or handling equipment, said exciter apparatus including an exciter housing, first bearing means and second bearing means positioned in said exciter housing, supporting two spaced driven shafts each carrying eccentric mass means externally of said exciter housing, said first and said second bearing means being lubricated by splash lubrication from individual lubrication liquid sumps for each of said first and said second bearing means, said exciter apparatus including cooling means to cool said first and said second bearing means and/or lubrication liquid in said individual lubrication liquid sumps. The cooling means may include the use of one or more heat pipes configured as described in the following parts of this specification. The term "heat pipe" is used in this specification to denote a heat transport system typically comprising a pipe constructed from a conductive metal such as copper that is closed at both ends to provide a closed system and contains a wick structure (e.g. powdered sintered copper) together with a liquid (including water) that is capable of absorbing heat to evaporate and condense again when it has moved to a cooler zone of the heat pipe. The evaporating and condensing of the liquid produce a form of pumping action or recirculation of the liquid/vapors in the heat pipe to cause movement along the heat pipe and thereby move heat from one end of the heat pipe to the other end of the heat pipe. Heat pipes do not, in themselves, dissipate heat but rather absorb heat at one end and lose heat at the other end if it is located in a cooler zone.

Preferably the cooling means may be one or more of the foregoing:
(i) a heat pipe or multiple heat pipes in an assembly, or multiple such assemblies, positioned in axially extending bores or passages, in the driven shaft(s);
(ii) one or more heat pipe(s) or assemblies of heat pipe(s) positioned in passage(s) in a wall structure or structures of the vibration exciter housing adjacent a liquid lubricant sump zone;
(iii) heat conductor elements embedded in one or each driven shaft;
(iv) heat conductor elements embedded in wall structures of the exciter housing adjacent one or more of the liquid lubricant sump zones(s);
(v) heat flow passages in one or both of the driven shafts to permit passage of a cooling fluid/gas there through;
(vi) heat flow passages in wall structures adjacent one or more of the liquid lubricant sump zones to allow a cooling fluid/gas flow there through; and
(vii) cooling from fan means positioned to promote air flow over regions to where heat has been moved to dissipate such heat including cooling fan means carried by one or each driven shaft.

In accordance with a still further aspect, exciter apparatus is provided configured, in use, to impose a vibration regime to processing or handling equipment, said exciter apparatus having an exciter housing part with an upper wall, a lower wall, opposed end walls, and opposed side faces defining an internal zone operationally supporting spaced bearing means, said exciter apparatus further having spaced first and second driven shafts each being supported by a respective said bearing means whereby an end portion of each of said first shaft and said second shaft extends beyond a side wall of said exciter housing part and carries eccentric mass means, said exciter apparatus still further including a mounting plate structure separate to said exciter housing and securable, in use, to said mineral processing or handling equipment, said exciter housing part having multiple spaced fastener receiving bore means extending through said exciter housing part from a first end zone at or adjacent said upper wall of said exciter housing part to a second end zone at or adjacent said lower wall of said exciter housing part, said mounting plate structure including multiple spaced fastener receiving fitting means positioned whereby a said first end zone and a said second end zone of respective said fastener receiving bore means are cooperable with a respective said fastener receiving fitting means.

In a still further aspect of this disclosure, an exciter apparatus assembly configuration is provided including:
- an exciter apparatus having a housing structure, said exciter apparatus being, in use, intended to apply a vibration regime to processing or handling equipment, said housing structure including a plurality of housing fastener zones in a first array; and
- a mounting structure separate to said housing structure, said mounting structure having a plurality of mounting structure fastener zones in a second array whereby, in use, said housing fastener zones and said mounting structure fastener zones are alignable enabling connecting fastener means to connect said housing fastener zones to said mounting structure zones.

Preferably, the mounting structure further includes a third array of fastener receiving zones enabling said mounting structure to be mounted operationally to said processing or handling equipment. More preferably, the housing structure has an upper wall and a lower wall, said housing fastener zones including a fastener bore means respectively extending from a first end zone at or adjacent to said upper wall to a second end zone at or adjacent said lower wall.

The first end zone of each said fastener bore means may preferably be located in a single plane. The first end zones may be located above, below or level with an upper surface of the upper wall. The second end zone of each said fastener bore means may preferably be located in a single plane. The second end zones may be located above, below or level with a lower surface of the lower wall.

According to the preceding paragraph, the assembly configuration allows for the possibility of a relatively standard exciter apparatus to be produced for a variety of differing installation designs with the mounting structure being a much simpler part providing the means for adapting the relatively standard exciter apparatus to a variety of different mounting structure designs.

In yet another aspect of this disclosure, there is provided a vibration exciter apparatus being mountable to vibration processing or handling equipment to impose in use a vibration regime to said vibration processing or handling equipment, said vibration exciter apparatus having an exciter housing with a base wall portion, a first end wall portion and a second end wall portion respectively extending upwardly from opposed end zones of said base wall portion, said base wall portion and said first and said second end wall portions defining an internal zone of the exciter housing having an upper face and two opposed side faces, said exciter housing further having a plurality of spaced first fastener positioning locations configured in a first array, said first fastener positioning locations permitting fastener elements to pass there through to engage with fastener locations when said vibration exciter apparatus is installed on said vibration processing or handling equipment, and a plurality of elongated fastener elements located in at least some of said first fastener positioning locations, each said fastener element having a head portion at one end and engagement formations at an opposed end engageable with a respective one of said fastener engagement locations in an installed position, wherein in said installed position, each said head portion is positioned at or adjacent either a lower face of said base wall portion or said upper face. This configuration allows access to the head portions of the fastener elements during installation without being obstructed by strengthening webs as described with reference to FIGS. 1 to 4 and without the need to remove the eccentric masses from the driven shafts or to move these eccentric masses to a non-obstructing position during an installation process. Thus the installation process is less difficult and it is more likely the fastener elements will be installed correctly.

Reference is made in the disclosure of this specification to exciter apparatus, either alone or with other similar devices or equipment being mountable to processing or handling equipment to impose a vibration regime thereto during the use of same. Such processing or handling equipment is primarily intended for use in the mineral processing or handling industries such as mining ore or coal, or quarrying other rock or earth based materials, however, such references are not intended to be limited thereto as the developments disclosed herein are equally applicable to any industry where a vibration regime is required to be imposed.

A number of aspects are disclosed herein in relation to achieving a certain result. It will be recognised by those skilled in the art that a feature disclosed in respect of one aspect may be utilised in any other aspect. Moreover it should also be understood that any terms, if used, such as "comprises", "comprising", "includes, "including", "haves", and/or "having", specify the presence of stated features, items, steps, operations, elements, materials and/or components, but do not preclude the presence of, or addition of, one or more other features, items, steps, operations, elements, components, materials and/or groups thereof. The disclosure of this specification should also be regarded as including the subject matter of the claims as annexed.

BRIEF DESCRIPTION OF THE DRAWINGS

FIG. 18 is an upper perspective view of the separate adapter mounting plate utilized to mount a standardized exciter apparatus to vibration processing or handling equipment;

FIG. 19 is a top plan view of the adapter mounting plate shown in FIG. 18;

FIG. 20 is an underneath plan view of the adapter mounting plate shown in FIG. 18;

DETAILED DESCRIPTION OF PREFERRED EMBODIMENTS

Figure 24:
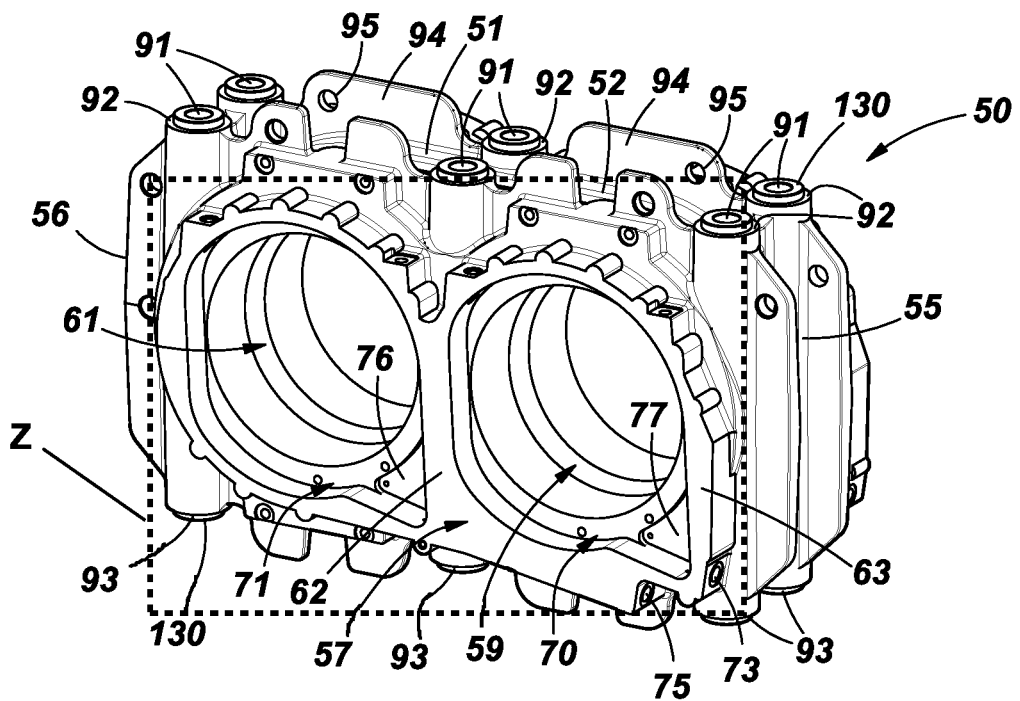
FIG. 24 is a perspective view of an exciter apparatus casing generally as utilised in earlier FIGS. 5 to 17 and 18 to 20.

Improvements in exciter apparatus 40 and associated parts such as an exciter apparatus casing 50 and an adapter mounting plate 60 are described in the following. The exciter apparatus casing 50 is shown in many of FIGS. 5 to 17 and 18 to 20 but is represented specifically in FIG. 21 as a single piece, typically constructed as a metallic casting. The exciter apparatus casing 50 has an upper wall 51 with an upwardly facing surface 52, a lower wall 53 with a downwardly facing surface 54, and two opposed end walls or wall portions 55, 56 continuously formed with the upper wall 51 and the lower wall 53 defining an internal zone Z (FIG. 24). The exciter apparatus casing 50 further includes a first side face 57 and a second side face 58, facing in opposite directions.

Figure 1:
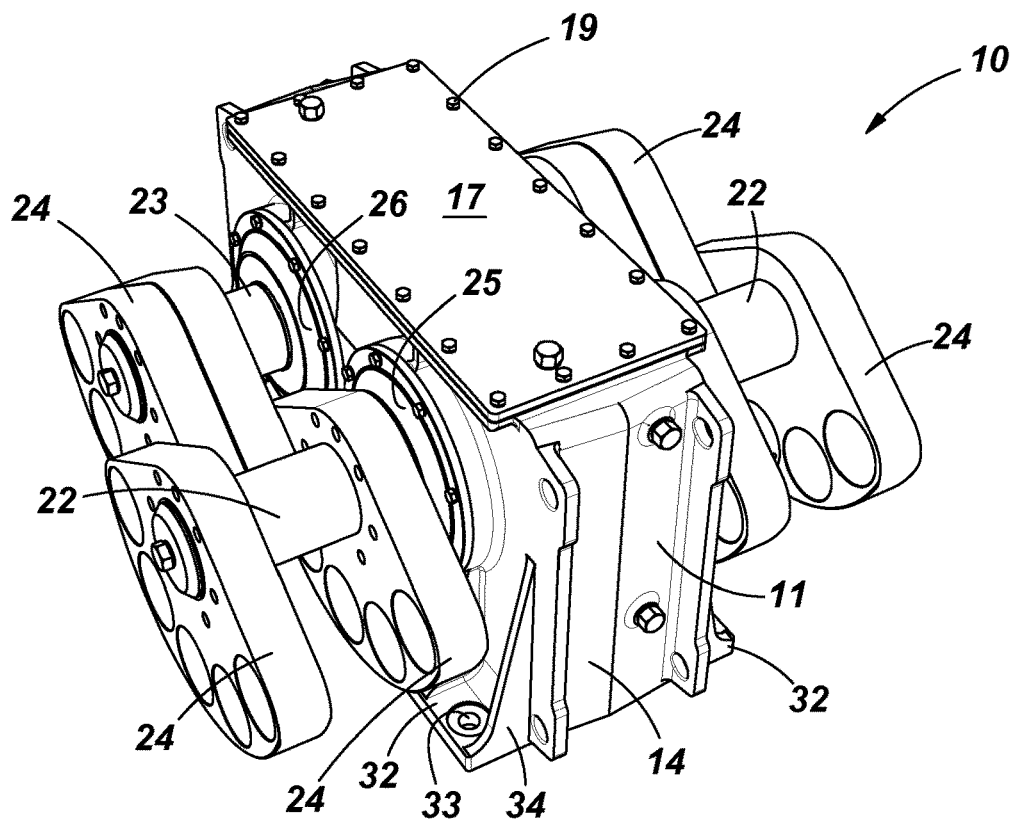
FIG. 1 is a perspective view of a DF6xx series prior art exciter apparatus.
Figure 2:
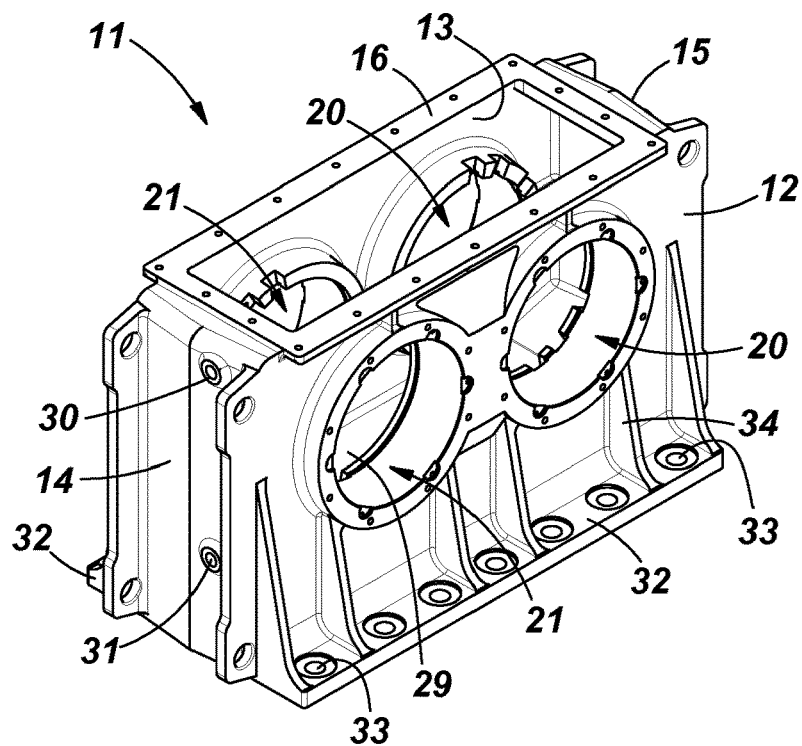
FIG. 2 is a perspective view of the exciter apparatus casing utilised in the exciter apparatus of FIG. 1.
Figure 3:
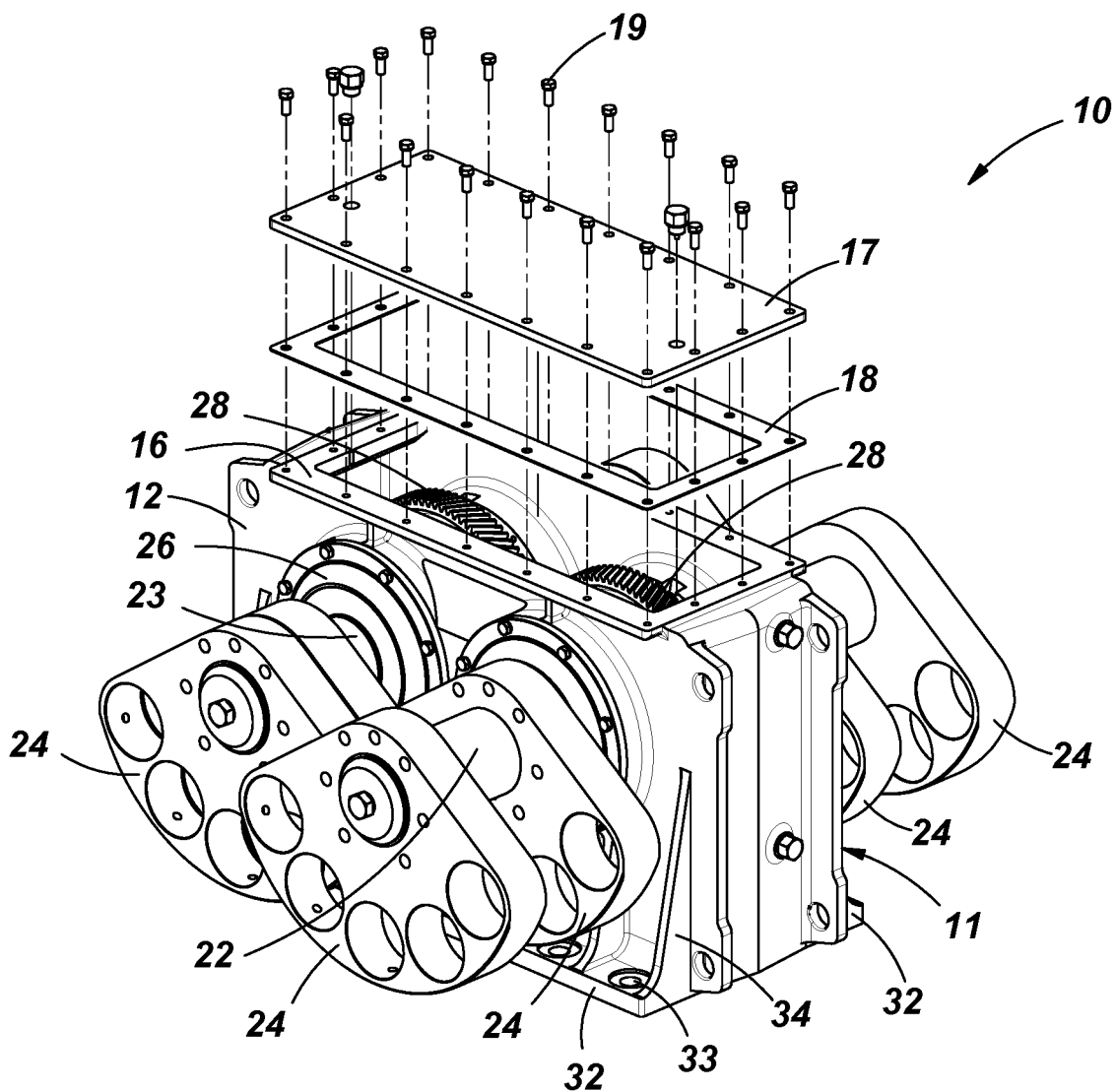
FIG. 3 is a partially exploded perspective view of the exciter apparatus shown in FIG. 1.
Figure 4:
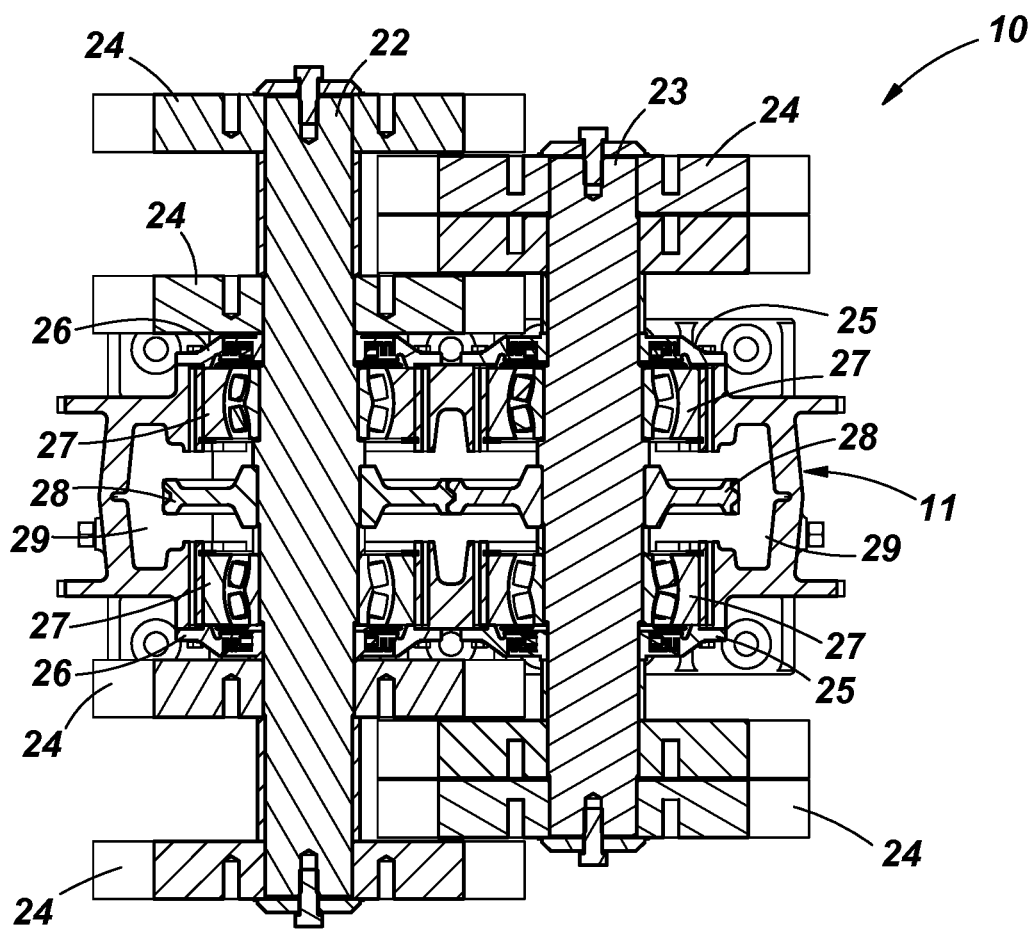
FIG. 4 is a transverse horizontal section through both driven shafts of FIG. 1.
Figure 5:
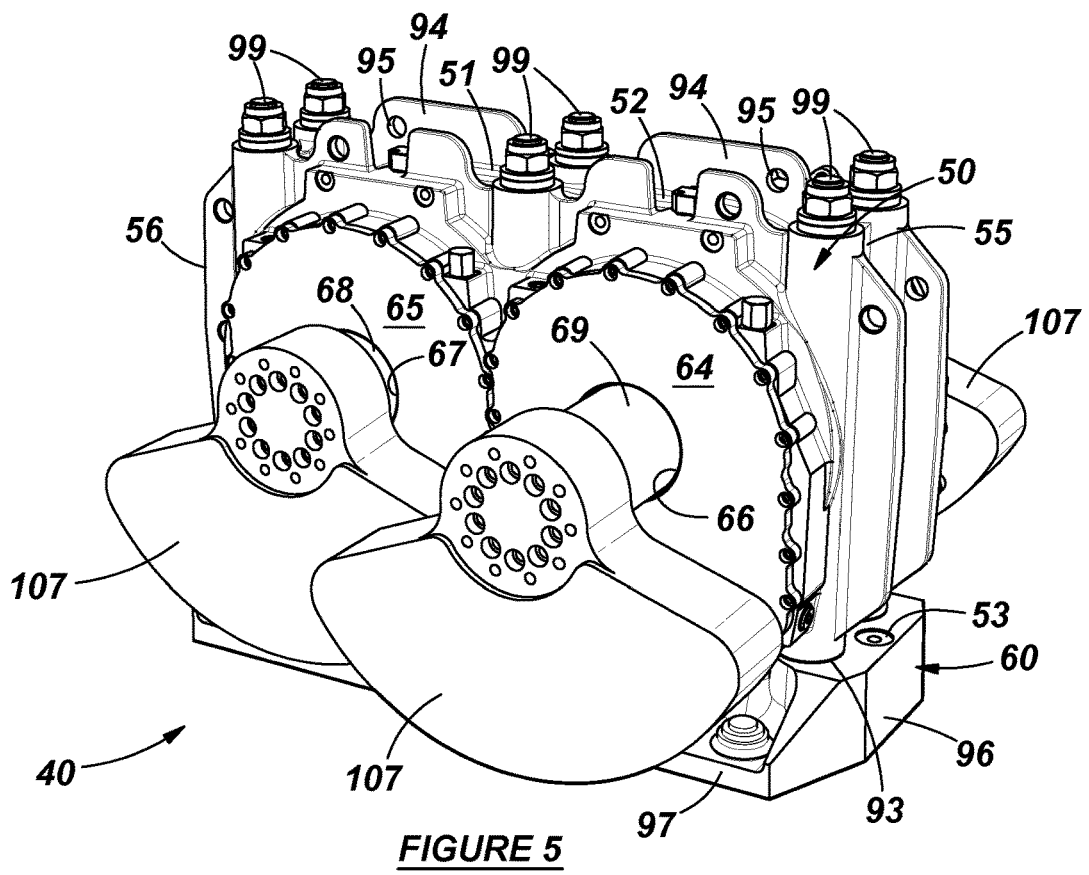
FIG. 5 is a perspective view of a preferred embodiment of exciter apparatus constructed in accordance with the developments of this disclosure.
Figure 6:
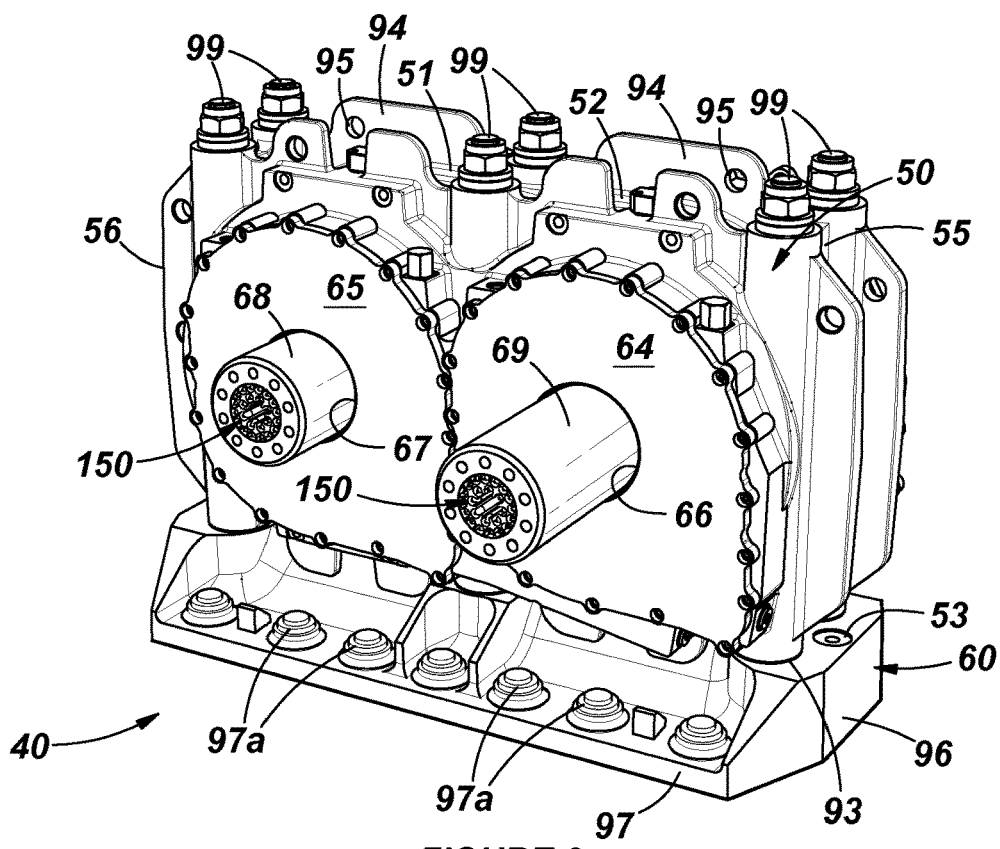
FIG. 6 is a perspective view similar to FIG. 5 but with the eccentric masses removed from the driven shafts.
Figure 21:
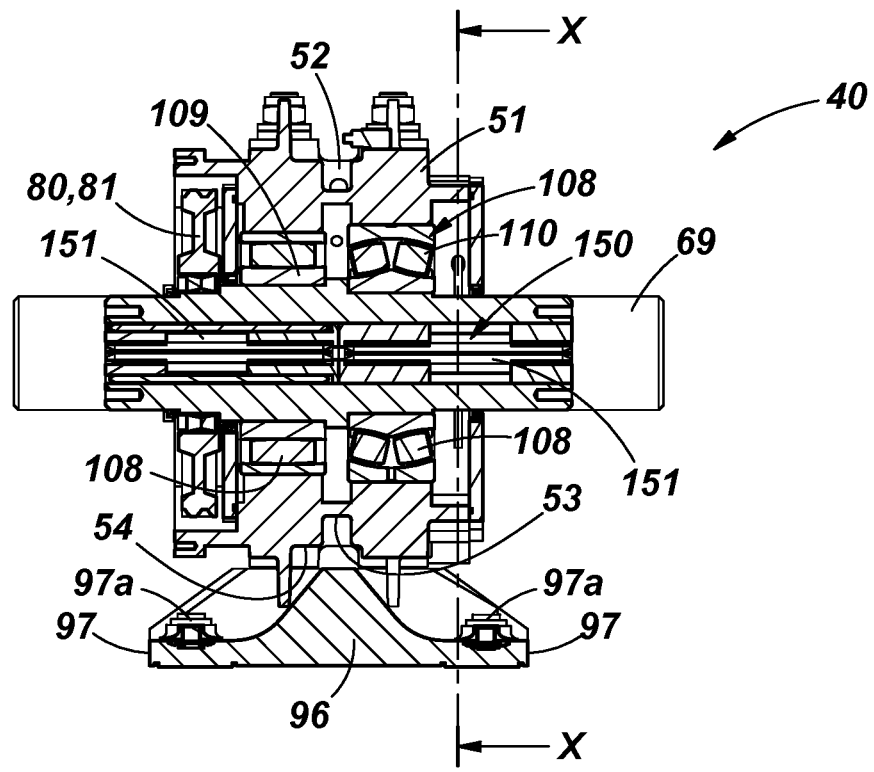
FIG. 21 is a vertical section view of the exciter apparatus passing through the short driven shaft.
Figure 22:
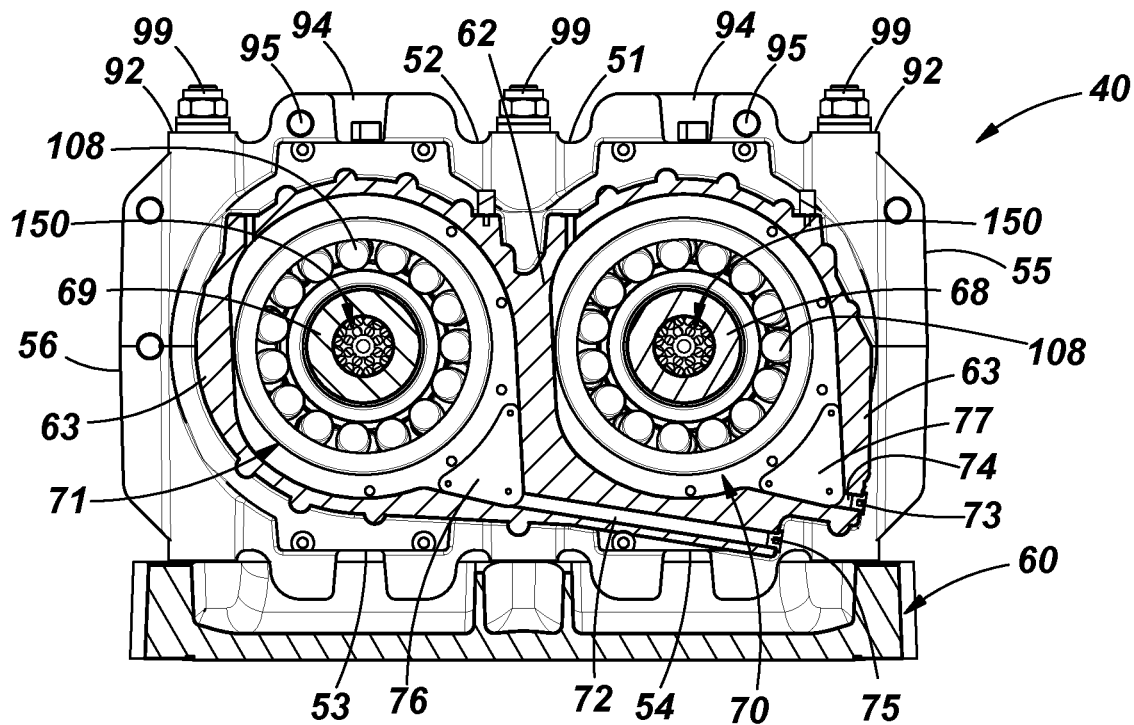
FIG. 22 is a section view along line X-X of FIG. 18.

As can be seen in FIG. 21, the exciter apparatus casing 50 has a first bearing mounting compartment 59 adjacent to and inwardly positioned relative to an end wall 55, and a second bearing mounting compartment 61 adjacent to and inwardly positioned relative to the other end wall 56. An intermediate wall structure 62 connected to the upper wall 51 and the lower wall 52 is positioned between the first and second bearing compartments 59, 61. A seal surface 63 is located in the first side face 57 and forms part of the intermediate wall structure 62 and surrounds the first and the second bearing compartments 59, 61. As can be seen in FIGS. 5, 6 and other drawings, closure plate members 64, 65 are mounted to and sealed to the seal surface 63 by a plurality of fastener members of any suitable type. The closure plate members 64, 65 include central openings 66, 67 which accommodate respectively a short driven shaft 68 and a long driven shaft 69 with suitable seals (not shown) engaging with the shafts 68, 69 to maintain sealed conditions within the exciter apparatus 40.

As also can be seen in FIG. 21 an enlarged region forming a first bearing lubricating liquid sump zone 70 is positioned between the first bearing mounting compartment 59 and the closure plate member 64. A similar enlarged region forming a second bearing liquid sump zone 71 is positioned between the second bearing mounting compartment 61 and the closure plate 65. In the assembled configuration of the exciter apparatus 40, the first and the second bearing liquid sump zones 70, 71 are maintained completely separate from one another whereby it is possible to prevent contaminants from the gear liquid sump entering the bearing liquid sumps, also to select and use lubricating liquids in the respective sump zones 70 and 71 that have differing characteristics, such as viscosity, that are best selected for operation of the exciter apparatus 40, particularly to improve performance of same and to extend periods between potential maintenance stages.

FIG. 19 illustrates a drain passage 74 leading from the first bearing liquid lubricant sump zone 70 to a drain point 73 whereby, during a maintenance stage, used liquid lubricant can be removed from the first bearing liquid sump zone 70. Similarly, a drain passage 72 leading from the second bearing liquid lubricant sump zone 71 to a drain point 75 is provided whereby during a maintenance stage, used liquid lubricant can be removed from the second bearing liquid lubricant sump zone 71. Suitable inlet port means are provided through the upper wall 51 to allow original or replacement liquid lubricant to be introduced into either the first or the second bearing liquid lubricant sumps 70, 71. As can be seen in FIG. 21, and other drawings, each of the first and the second bearing liquid lubricant sump zones 70, 71 have a triangular shaped bulge or extension region 76, 77 approaching the entrances to drain passages 72, 74 acting as a collection zone for the liquid lubricant and potentially any particulate debris that might enter or be formed within the exciter apparatus such that it might be removed with any used or spent liquid lubricant.

FIGS. 20, 21 illustrate that each of the first and the second bearing mounting compartments 59, 61 end part way towards the second side face 58. The second side face 58 has a seal surface 78 generally surrounding a gearing mounting compartment 79 configured to house separate intermeshing gears 80, 81 that are mounted on the driven shafts 68, 69. Closure plates 82, 83 (FIG. 14) are sealed to the first and second bearing mounting compartments 59, 61 internally of the exciter apparatus 40. The closure plates 82, 83 have central openings 84, 85 through which the driven shafts 68, 69 pass, the closure plates 82, 83 having suitable seal means to prevent liquid lubricant and other materials to pass along the shafts.

Figure 17:
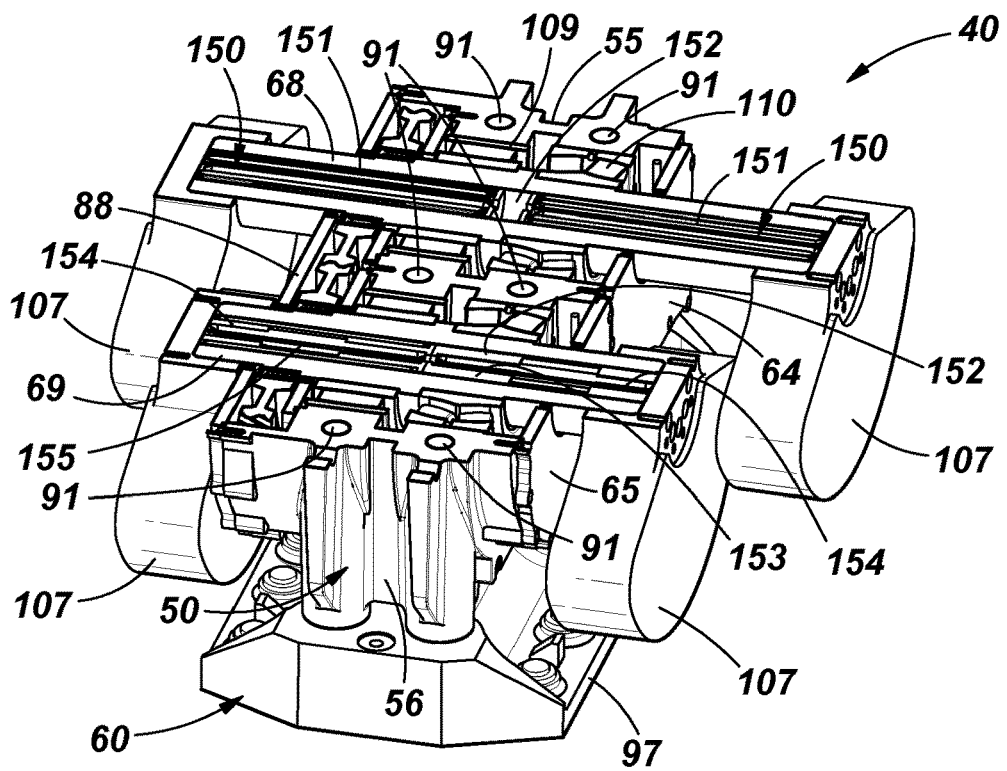
FIG. 17 is a horizontally sectioned perspective view through the driven shafts of the exciter apparatus of FIG. 5.

As shown, for example, in FIGS. 17, 18 and 20, bearing means 108 may be provided to support the driven shafts 68, 69 in the first and the second bearing mounting compartments 59, 61. The bearing means 108, in each case, may comprise a pair of side by side bearing members 109 and 110. The bearing member 109 is conveniently a toroidal roller bearing and the bearing member 110 is a spherical roller bearing (SRB). While the drawings represent two driven shafts 68, 69 and a consequent supporting bearing arrangement as illustrated, in some embodiments one driven shaft only might be provided and more than two driven shafts might be provided.

Figure 7:
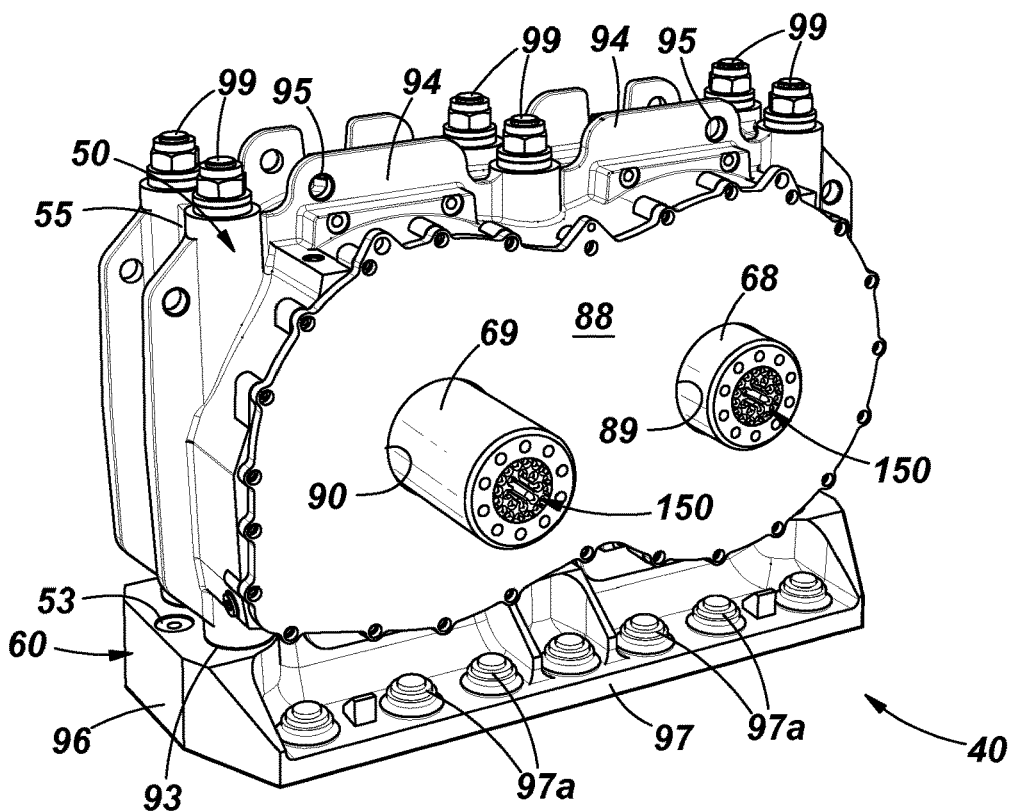
FIG. 7 is a perspective view of the exciter apparatus of FIG. 6 taken from the opposite side.
Figure 8:
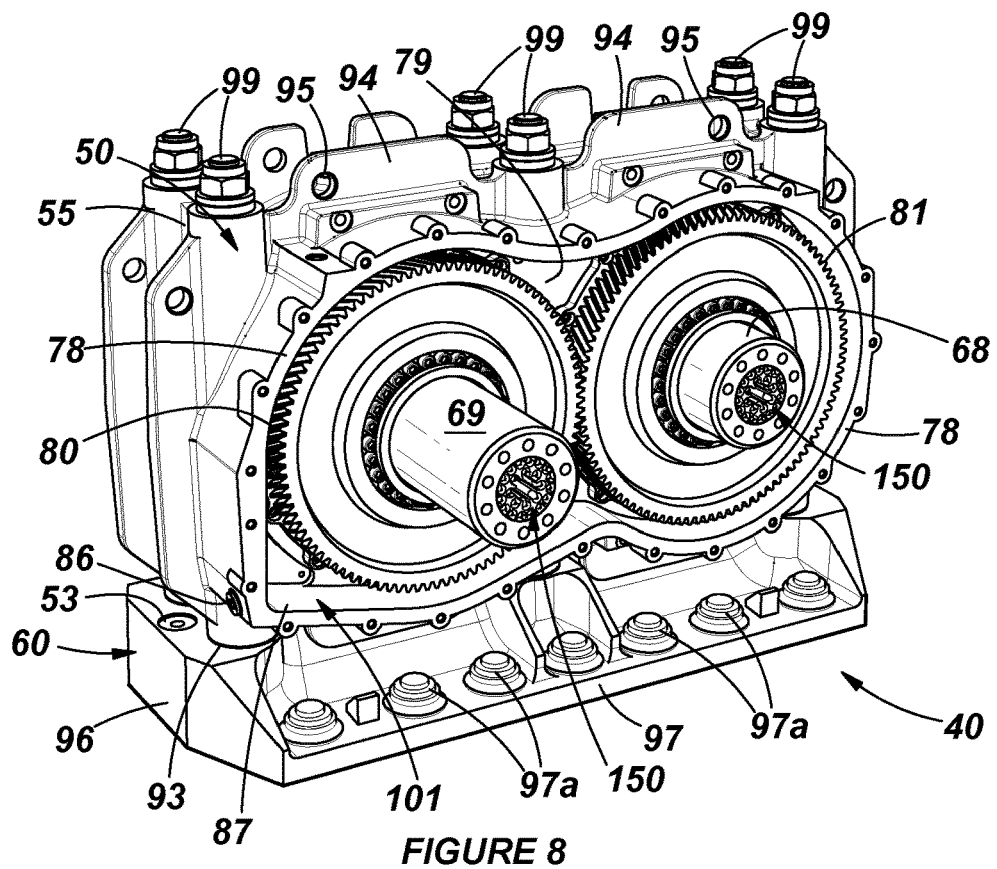
FIG. 8 is a perspective view similar to FIG. 7 but with side closure plate removed.

The gearing mounting compartment 79 has a liquid lubricant introduction port in the upper wall 51 whereby liquid lubricant of a desired type or characteristics can be introduced into the compartment 79 either before use or during a later maintenance stage of the exciter apparatus 40. A drain port 86 (FIG. 8) is provided with a communicating drain passage leading to a lower region of the gearing mounting compartment 79. Conveniently, the gearing mounting compartment 79 includes an enlarged triangular bulge portion 87 leading to the drain passage at a low portion of the compartment 79. The compartment 79 provides a gearing lubricating liquid sump zone 101. Conveniently, an outer closure plate 88 closes the gearing mounting compartment 79 by sealing means and multiple fastener members pressing an edge face region of the outer closure plate 88 against the seal surface 78. Again the closure plate 88 includes central openings 89, 90 and seal means cooperating with the driven shafts 68, 69 (FIG. 7).

Referring again to FIG. 21, the exciter apparatus casing 50 incudes a plurality of spaced first fastener positioning locations that comprise elongated fastener receiving bore means 91 positioned vertically extending through the casing 50. Each of the fastener receiving bore means 91 includes a first end zone 92 disposed at or adjacent to the upwardly facing surface 52 of the upper wall 51, and a second end zone 93 disposed at or adjacent to the downwardly facing surface 54 of the lower wall 53. Preferably, the fastener receiving bore means 91 includes a continuous bore passage from the first end zone 92 to the second end zone 93. Alternatively, at least some of the fastener receiving bore means 91 include a first bore passage section adjacent the first end zone 92 with a continuous bore passage section aligned with a second bore passage section adjacent the second end zone 93 with a continuous bore passage section. In this latter option, seal means operating between a cooperating elongated fastener and the fastener receiving bore means 91 at the upper level of the exciter apparatus casing 50 and at the lower level of the exciter apparatus housing would be required.

In the illustrated preferred embodiment shown in FIG. 21 and other figures, the fastener receiving bore means 91 are disposed in a defined array, consisting of six bore passages 91, each being adapted to receive an elongated bolt, rod or other suitable fastener 99. Two such bore passages are located on a transverse mid point axis of the exciter apparatus casing 50 and two each are located extending through a respective end wall 55 and 56. In some cases, the two centrally located bore passages might be replaced by a single bore passage centrally located. Other possible arrangements of bore passages in the array are possible, however it is desirable to have the bore passages symmetrically disposed about a central transverse axis. Both of the first end zone 92 and the second end zone 93 may include physical annular ring formations 92a/93a such as the illustrated raised annular ring that is complementary shaped with physical formation means 130 on the adapter mounting plate 60 to prevent or minimise lateral movement when engaged. If desired the annular ring formations 92a/93a in both the upper wall 51 and the lower wall 52 of the exciter casing 50 may include inclined surfaces to assist movement of the bores 91 into alignment with fastener element engagement regions positioned on the adapter mounting plate 60.

FIGS. 18, 19 and 20 show preferred features of the adapter mounting plate 60 shown in other drawings. The adapter mounting plate 60 has a generally rectangular shape when viewed in plan view with a central raised or thicker region 96 and opposed lateral edge flanges 97, each with an array of fastener receiving locations (bores) 136 enabling, in use, a fastener element 97a to be installed there through and into a fastener receiving or mounting formation 136 (eg a threaded bore or similar) positioned in vibration processing or handling equipment 200 to which the vibration exciter apparatus is to be mounted. Of course the fastener receiving or mounting formation 131 could be threaded stud members mounted to the vibration processing or handling equipment over which the fastener receiving or mounting formations 136 are fitted with nuts being threaded onto the threaded studs to secure the adapter mounting plate 60 to the vibration processing or handling equipment. The fastener receiving or mounting formations may be previously existing, for example, used to directly mount a vibration exciter apparatus to the vibration processing or handling equipment, or in some cases, could be intentionally created for mounting an original (or replacement) vibration exciter apparatus to the vibration processing or handling equipment. Given that the adapter mounting plate 60 is a relatively less expensive item to produce compared to a vibration exciter apparatus casing itself, that it would be possible to produce a number of such adapter mounting plates 60, each having a different configuration of fastener receiving locations 136 to fit a variety of known existing arrays of fastener receiving formations in known vibration processing or handling equipment.

Preferably, both the upper wall 51 and the lower wall 52 includes upstanding flange members 94 with apertures 95 to assist lifting means to be connected to the exciter apparatus 40 when installing or removing such exciter apparatus from an operative position.

The adapter mounting plate 60 further includes a plurality of spaced second fastener positioning locations comprising long bolt (or rod) fastening positions (eg threaded bores) 98 disposed in an array comprising a pair 140 and 141 at either end of the adapter mounting plate 60 with a central pair 142 positioned on a central transverse axis 143. The array of fastening positions 98 are complementary to the array of the first end zones 92 and the second end zones 93 of the fastener receiving bore means 91 formed in the exciter housing 50 whereby an elongated fastener member or element 99 passing through a bore means 91 can be engaged in and retained in a fastening position 98. Preferably, the fastening positions 98 located at one end of the adapter mounting plate 60 are a mirror image of the fastening positions 98 at the other end of the mounting plate 60 about the central transverse axis 143 whereby the casing 50 of the vibration exciter apparatus 40 can be rotated through 180 degrees about an upright central axis and still retain the bore means 91 being aligned with a respective fastening position 98. Moreover, the first end zones 92 and the second end zones 93 provided on the upper wall 51 and the lower wall 52 of the exciter apparatus casing are complementary to the receiving formations 140 surrounding the fastener receiving locations 136 formed in the adapter mounting plate 60. This enables either the upper wall 51 or the lower wall 52 to be positioned adjacent the adapter mounting plate 60 depending on the desired mounting configuration of the vibration exciter apparatus 40 to the vibration processing or handling equipment to which the adapter mounting plate 60 is mounted.

Figure 9:
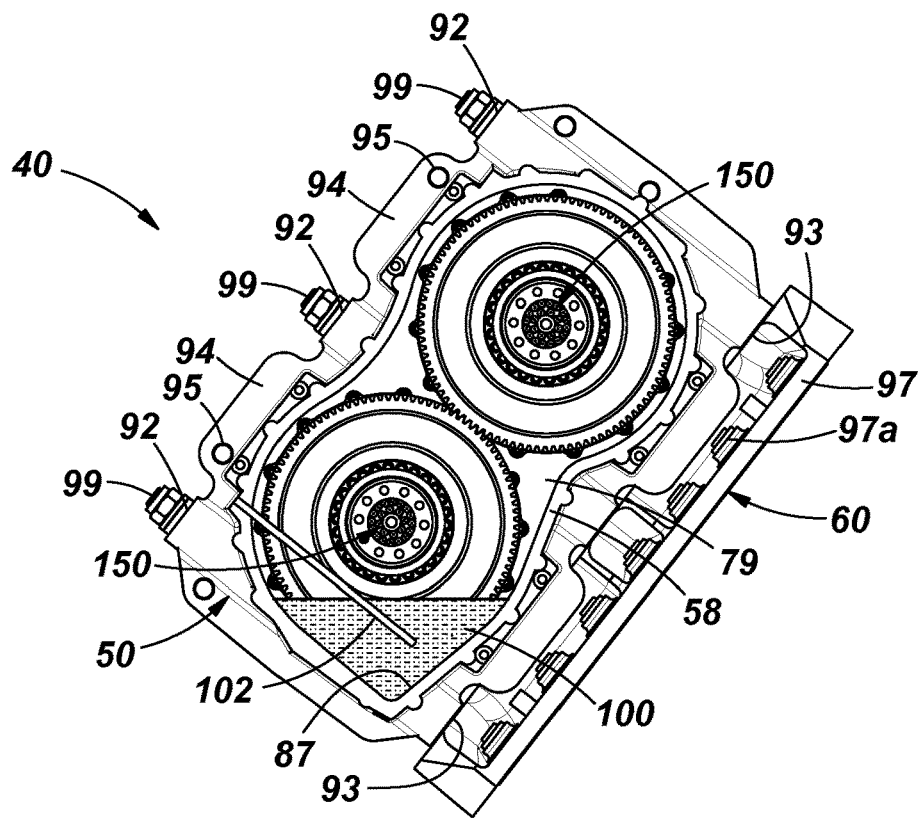
FIGS. 9 and 10 are side elevation views similar to FIG. 8 showing potential differing installation positions of the exciter apparatus, from the intermeshing gear side of the exciter apparatus.
Figure 10:
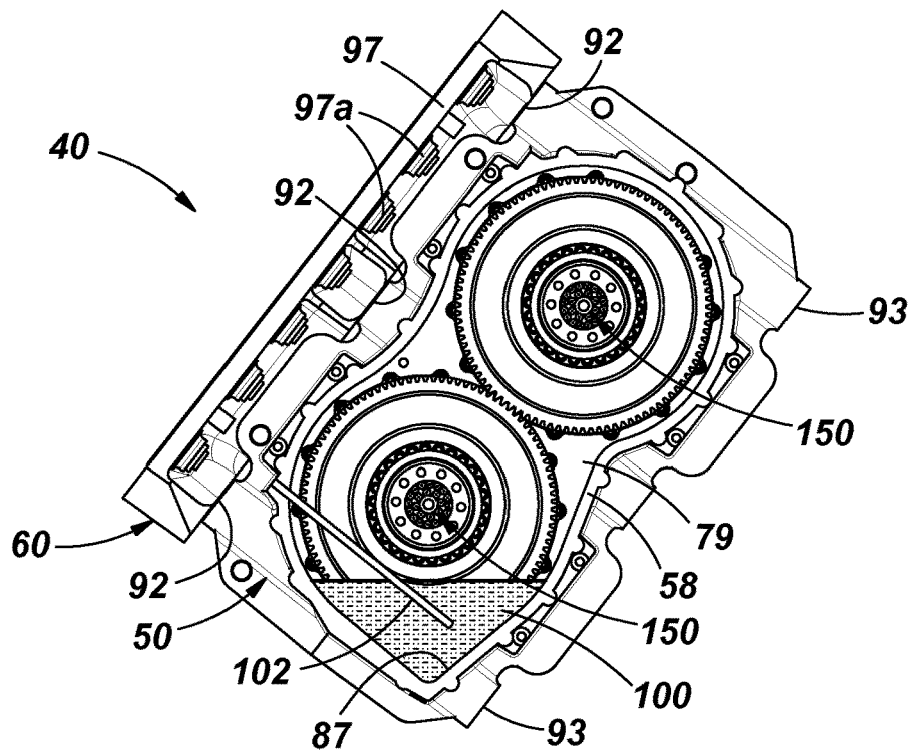
Figure 11:
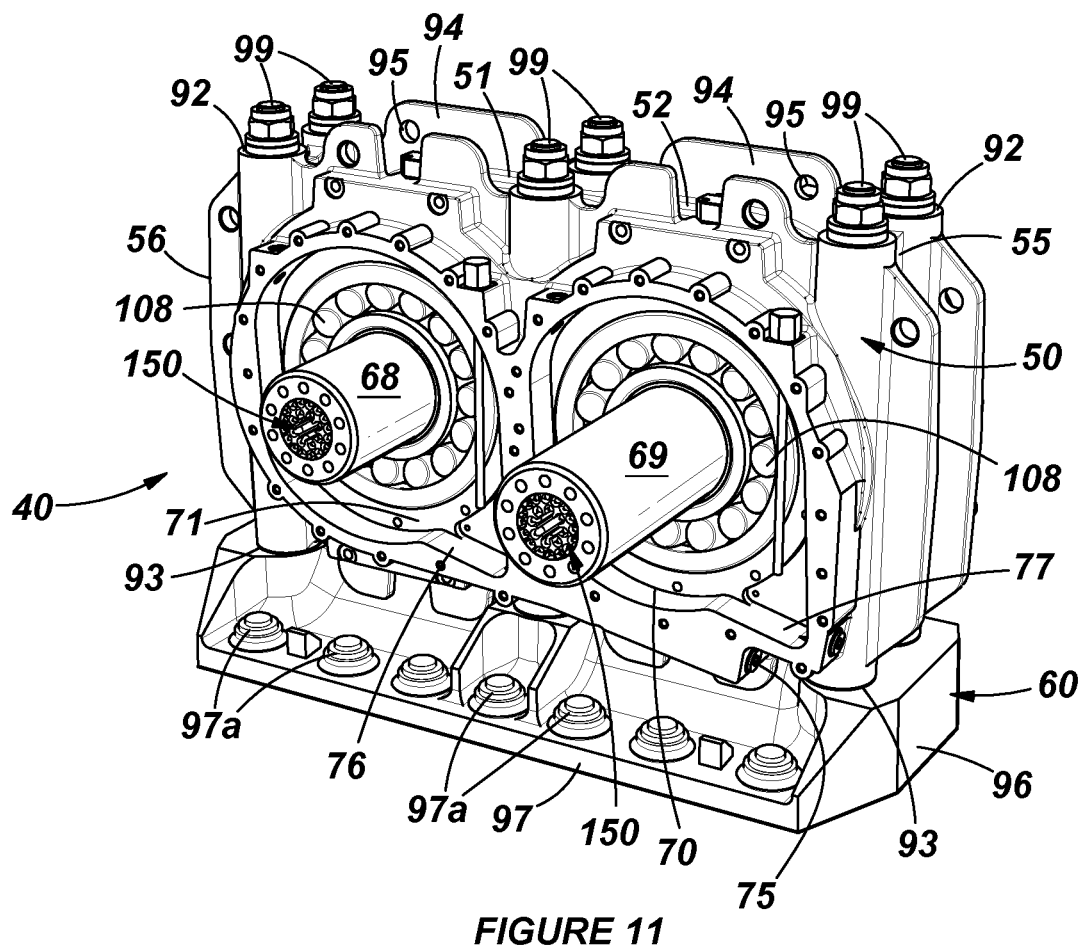
FIG. 11 is a perspective view similar to FIG. 6 but with the side closure plates removed revealing bearing means supporting the driven shafts.
Figure 12:
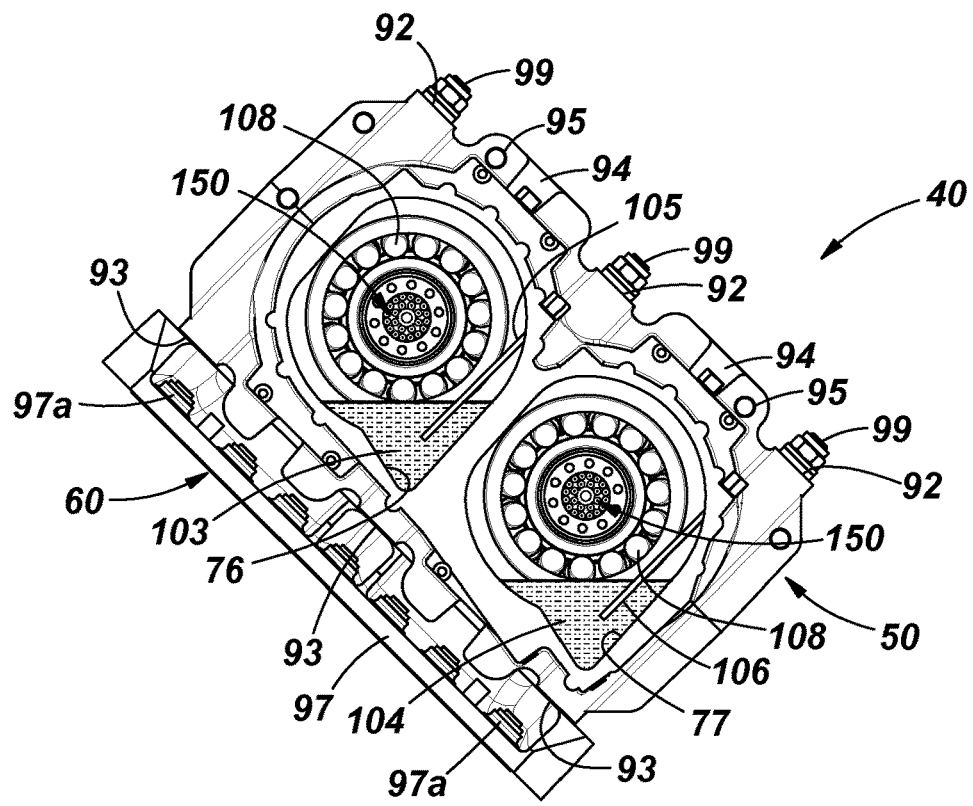
FIGS. 12 and 13 are side elevation views similar to FIG. 11 showing potential differing installation positions of the exciter apparatus, from the bearing means side of the exciter apparatus.
Figure 13:
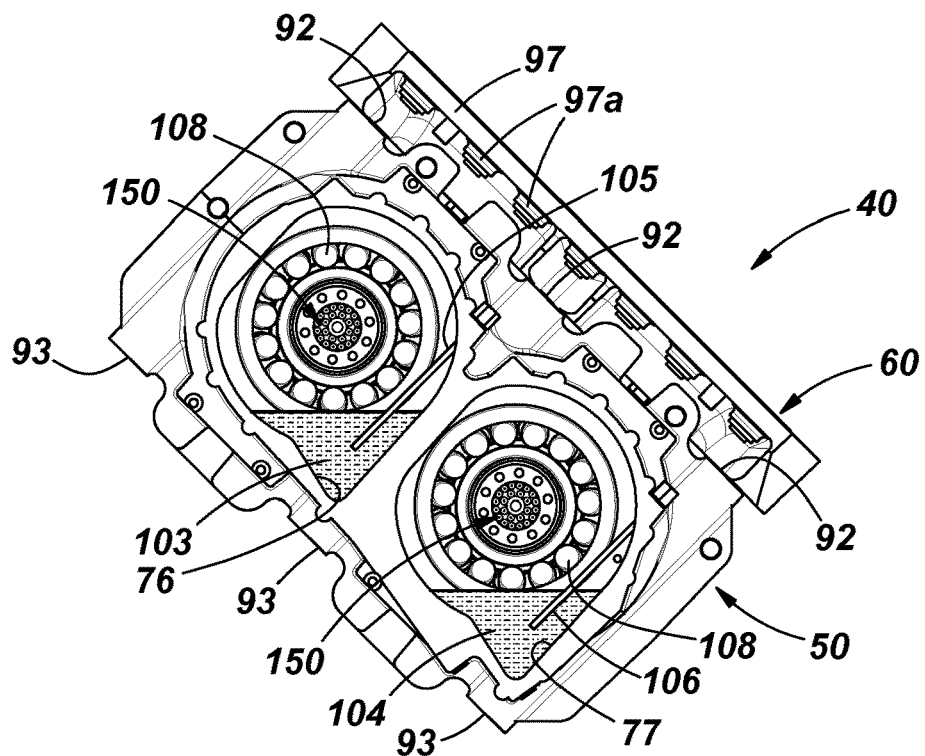
Figure 14:
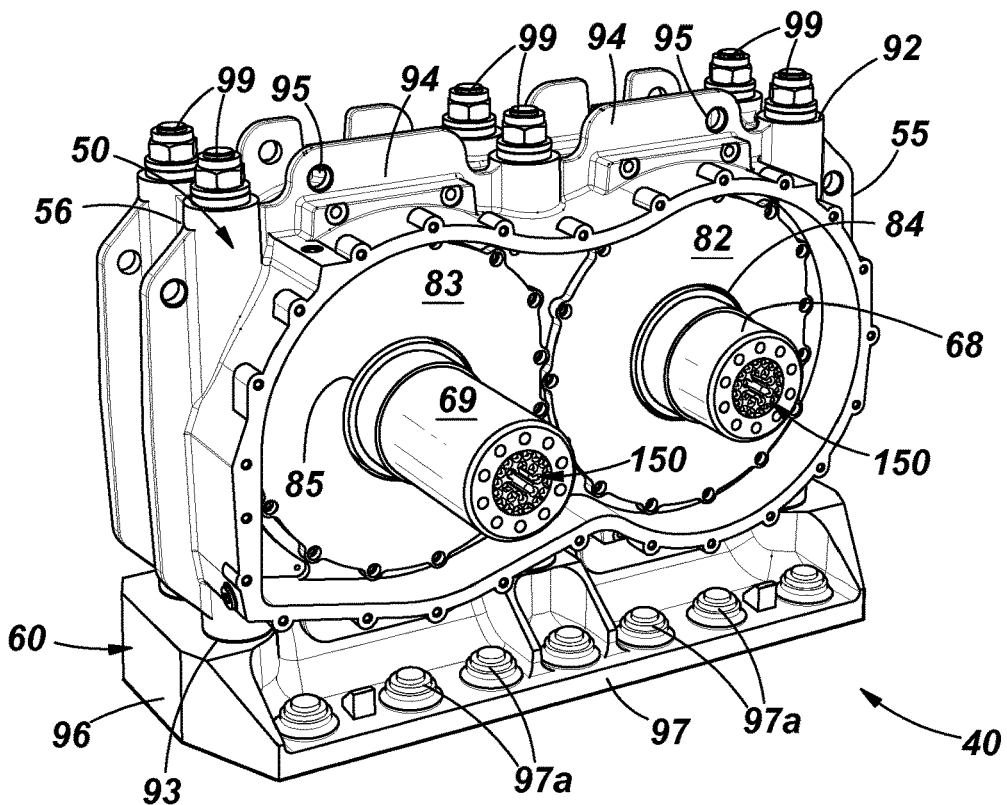
FIG. 14 is a perspective view similar to FIGS. 7 and 8 but with the gearing element compartment closure plate and the gearing elements removed with closure plates closing bearing compartments housing bearings supporting the driven shafts.
Figure 15:
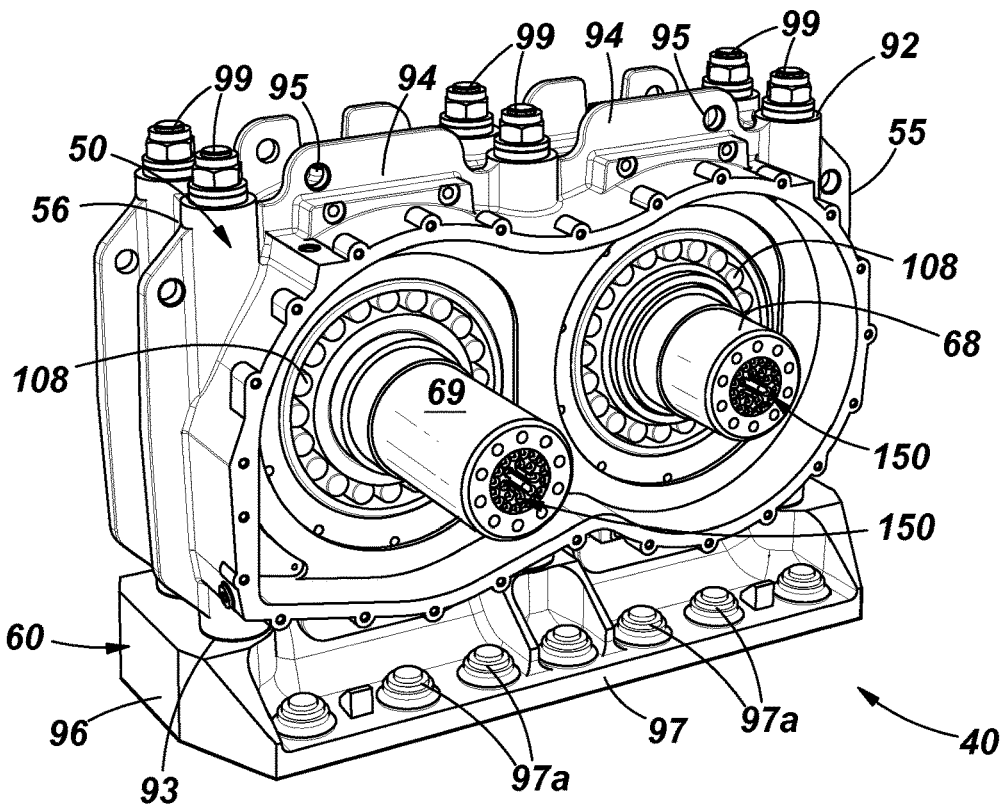
FIG. 15 is a view similar to FIG. 14 but from the other side with the bearing compartment closure plates removed showing bearings in the bearing compartments.
Figure 16:
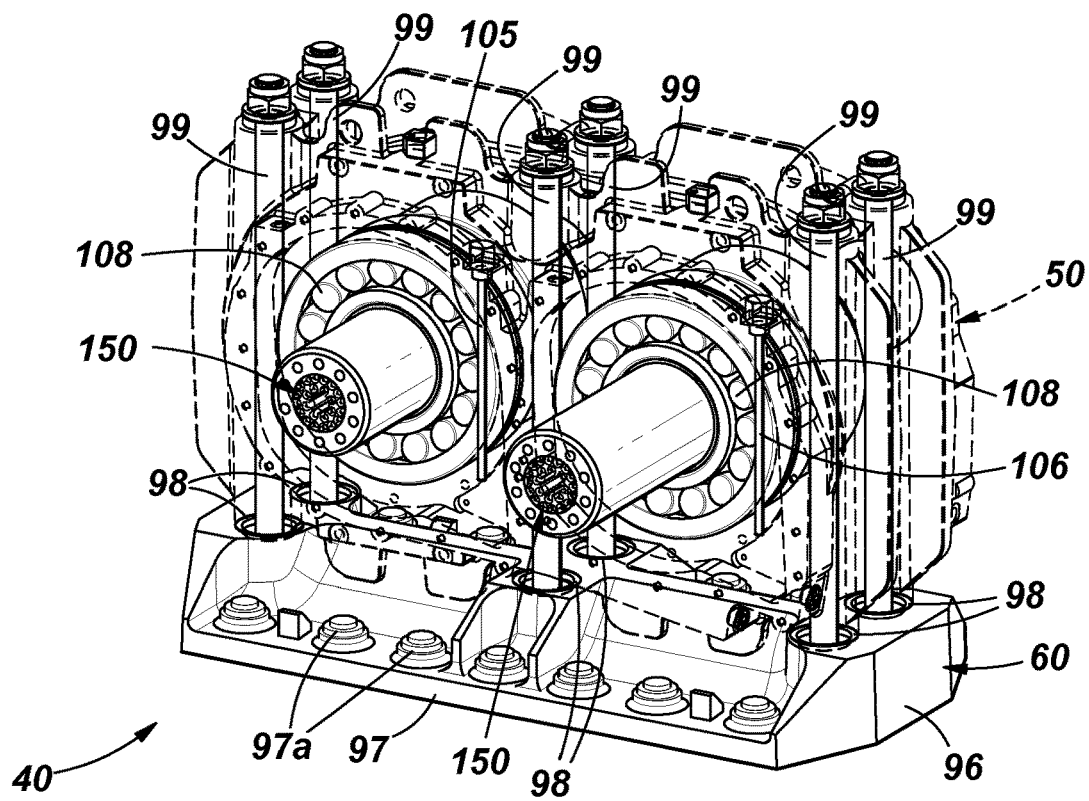
FIG. 16 is a perspective view similar to FIG. 6 but with the exciter apparatus casing shown in ghosted outline to reveal aspects of the elongated fastener elements.

FIGS. 9/10 and FIGS. 12/13 illustrate the effect of mounting the exciter apparatus 40 and the associated adapter mounting plate 60 at differing angles of inclination and particularly when the exciter apparatus is partially inverted as shown in FIGS. 10 and 13. FIGS. 9/10 show the exciter apparatus from the gearing side of the exciter apparatus 40 with the outer closure plate 88 removed. FIGS. 12/13 show the exciter apparatus 40 from the bearing side of the exciter apparatus 40 with the two outer closure plates 64, 65 removed. As shown in FIG. 9, the lower wall 53 of the exciter apparatus casing 50 faces toward the adapter mounting plate 60 with the second end zones 93 of the fastener receiving bore means 91 in engagement with a respective long bolt or rod fastening position 98. In the partially inclined and inverted position shown in FIG. 10 the first end zones 92 of the upper wall 51 are positioned in engagement with a fastening position 98 on the adapter mounting plate 60. In either positional location represented in FIGS. 9 and 10 an elongated fastener member 99 passes through the fastener receiving bore means 91 to secure the exciter apparatus 40 to the adapter mounting plate 60 and thereby to the processing or handling equipment (not shown). FIGS. 9 and 10 illustrate the lubricating liquid pool 100 collected in the gearing lubricating liquid sump zone 101 formed by the compartment 79. The lubricating liquid pool 100 is collected in the region of the enlarged bulge portion 87 and a stationary, semi-permanent, level measuring probe 102 is provided to provide automatically a signal indicative of the liquid level, and thereby, the volume of lubricating liquid in the gearing mounting compartment 79. If the mounting inclination angle is reversed, then the illustrated structures permit the exciter apparatus 40 to be rotated about a central vertical axis such that the lubricating liquid pool 100 will always form in the region of enlarged bulge portion 87 and the level measuring probe 102. In this manner, it is possible to achieve consistent measuring of lubricating liquid volumes in the gearing mounting compartment.

FIGS. 12 and 13 show the effects discussed in the preceding paragraph from the bearing side of the exciter apparatus 40. It is apparent from these drawings that separate lubricating liquid pools 103 and 104 are maintained in the first bearing liquid lubricant sump zone 70 and the second lubricant liquid sump zone 71 with the pools 103, 104 being located in the region of the extension or bulged regions 76, 77. In addition separate liquid level measuring probes 105, 106 are installed in these zones.

FIGS. 9/10 and 12/13 represent the vibration exciter housing 50 mounted in an upwardly extending inclined position (FIGS. 9/12) and an underslung downwardly extending position (FIGS. 10/13). It will of course be appreciated that the angle of inclination of the mounting position could be reversed such that the end wall portions of the exciter housing 50 forming the lowest one of the end wall portions in FIGS. 9/10 and 12/13 would become the higher of the two end wall portions. This would of course be problematic in that the liquid lubricant pools would change position and the liquid lubricant level sensors 102, 105, 106, may not be correctly immersed in the liquid lubricant pools. To avoid this difficultly, the first array of fastener element positioning locations (bores 91) on the upper or lower walls of the exciter housing 50 are positioned whereby the exciter housing 50 can be rotated about a vertical intermediate axis such that the end wall represented as the lower most one in FIGS. 9/10 and 12/13 will always remain the lower most end wall whereby the liquid lubricant pools in the respective sump zones will remain in the same position (as illustrated in FIGS. 9/10 and 12/13). This can be achieved by arranging the fastener receiving bores 91 to be in an array whereby the bores 91 on one side of a central transverse axis is a mirror image of the bores 91 on the other side of the central transverse axis 143 such that regardless of rotating the position of the exciter housing 50, the bores 91 will continue to align with fastener receiving connection zones in the adapter mounting plate 60 or the vibration processing or handling equipment itself. In the illustrated embodiment, three pairs of fastener receiving bores 91 are illustrated with the central pair of fastener receiving bores 91 being positioned on the aforesaid transverse axis 143. Other configurations, are of course, possible.

Generally, the exciter apparatus 40 will carry eccentric masses 107 carried on the driven shafts 68, 69 (FIG. 5). In the proposed design, the one eccentric mass 107 is carried at each end zone of the driven shafts 68, 69 which overlap, in use when the driven shafts 68, 69 are rotated. Dynamic guard shields would also be provided (not illustrated) mounted from the exciter apparatus casing 50, however, because of the design arrangements previously described access to the elongated fastener member 99 is not obstructed. This enables the dynamic guard shields to remain attached to the exciter apparatus 40 if the exciter apparatus 40 is to be removed for any purpose.

Figure 23:
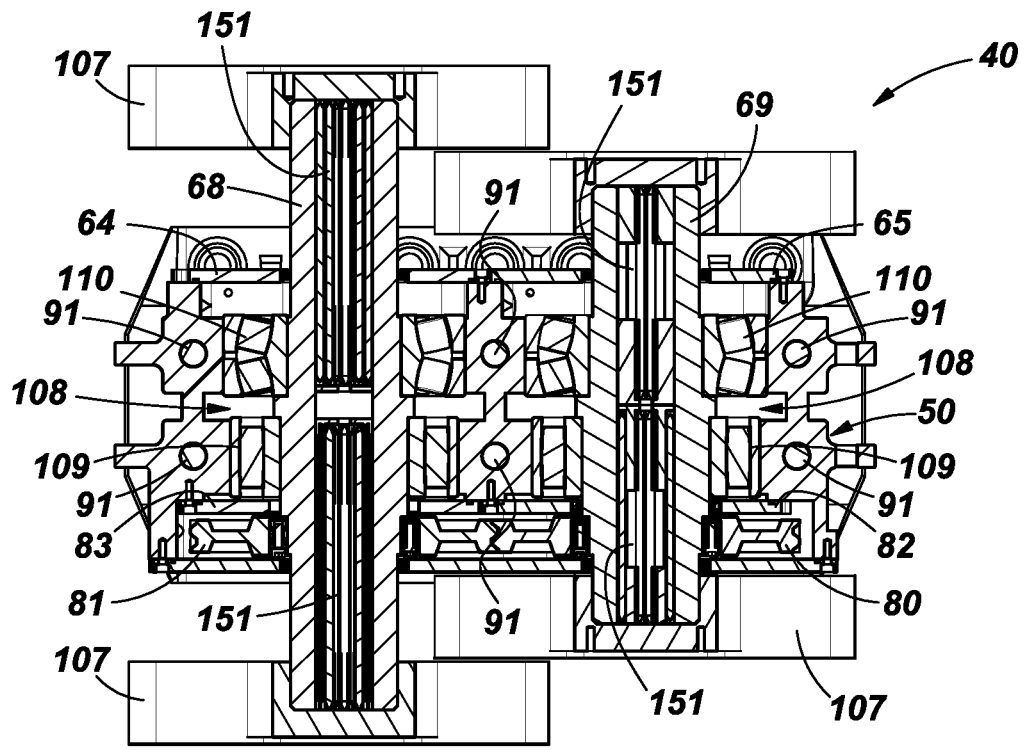
FIG. 23 is a horizontal section in plan view of the exciter apparatus generally through the driven shafts.

FIGS. 17, 21 and 23 and other drawings illustrate one preferred cooling means 150 for coding the liquid lubricant in the lubricating liquid pools 103, 104 and the bearing means 108. In this proposal, one or multiple cooling element cartridges 151 are installed in a bore or passage 152 axially extending fully through the or each driven shaft 68/69, or at least from a position underlying each bearing means 108 to a position external of the exciter housing 50. Each cooling element cartridge 151 includes a heat receiving mounting part 153 at one end and a heat dissipating part 154 at an external end. Alternatively, in a one piece assembly, a central heat receiving mounting part 153 might be provided with two opposed heat dissipating parts 154 at distal ends of the assembly. Each of the cooling element cartridges 151 further includes at least one and preferably multiple heat pipes 155 as described previously. A heat flow path is thereby established from the bearing means 108 through a respective driven shaft 68 or 69 to a heat receiving mounting part 153 along the heat pipe or pipes 155 to the heat dissipating mounting part 154 positioned externally of the exciter housing 50. Thus generated heat can be moved to an external location and dissipated therefrom. The heat dissipation process may be helped by providing fan means mounted on a driven shaft, on each driven shaft, or elsewhere in the vibration apparatus 40. Other possible options might also be used for cooling parts of the exciter apparatus 40, to lower operating temperatures to effectively extend periods of time between maintenance down times. The disclosure proposes, as indicated previously, separate lubricating liquid sump zones with an expectation that these configurations will result in higher heat transfer out of the bearings that occur with current designs. A second option is to utilise high thermal conductivity materials, in the exciter apparatus casing structures, particularly in bearing compartment closure covers. A third potential option is to provide a cooling fan on one or both driven shafts to increase air flow onto the exciter apparatus casing walls. A fourth option is to provide high thermal conductivity inserts into the exciter apparatus walls or the driven shafts. A fifth option is to position heat flow pipes for passage of cooling air flow or liquid flow in the housing walls and the driven shafts. Of course, multiple such options might be utilised. FIGS. 16, 17, 18 and 19 illustrate options for locating heat movement or transfer cartridges 151 in the driven shafts 68, 69.

The foregoing describes various preferred embodiments of exciter apparatus for imposing a vibration regime to mineral processing or handling equipment and to parts of such exciter apparatus. Improvement features, in some instances, also relate to and may be applied to other known exciter apparatus by skilled persons in this art. Features disclosed specifically in relation to one embodiment might equally apply to other exciter apparatus, and parts of same, within the context of the annexed patent claims, including prior art vibration exciter apparatus such as those exemplified in FIGS. 1 to 4. For example, the exciter housing 11 might include a second laterally extending flange similar to the flange 32 but extending from the side walls 12, 13 at a location at or adjacent the upper face of the exciter housing 11 permitting long bolt fasteners to pass through receiving bores 33 in both such flanges or to selectably use one or other of the bores 33 in respective flange structures with shorter bolt fasteners in ways described earlier for variable positioning of the vibration exciter apparatus.

The invention claimed is:

1. A vibration exciter apparatus being mountable to vibration processing or handling equipment to impose, in use, a vibration regime to said vibration processing or handling equipment, said vibration exciter apparatus comprising:
an exciter casing having a lower wall, two opposed end wall portions extending upwardly from opposed end zones of the lower wall and having an upwardly facing surface and two opposed side faces together defining an internal zone, said exciter casing further having a plurality of spaced first fastener positioning locations positioned at or adjacent the upwardly facing surface and configured in a first array, said exciter casing also having a plurality of spaced second fastener positioning locations positioned at or adjacent the lower wall in a second array, whereby at least one of said first array of said first fastener positioning locations and/or said second array of said second fastener positioning locations co-operate with multiple fastener elements to secure said vibrational exciter apparatus in an operational position of use to said vibration processing or handling equipment with selectably either upwardly facing surface or the lower wall being positioned closer to said vibration processing or handling equipment, wherein the first array of said first fastener positioning locations are aligned with the second array of said second fastener positioning locations, whereby a said fastener element or multiple said fastener elements pass through both a said first fastener positioning location and a said second fastener positioning location when said vibration exciter apparatus is secured to said vibration processing or handling equipment.

2. The vibration exciter apparatus according to claim 1, wherein a fastener element or multiple fastener elements pass through only one of said first fastener positioning locations or one of said second fastener positioning locations.

3. The vibration exciter apparatus according to claim 1, further comprising a separate mounting plate cooperable with said exciter casing and being secured to the vibration processing or handling equipment, said separate mounting plate including a plurality of spaced fastener receiving bore means positioned such that a said first portion or a said second portion of a respective said fastener positioning location cooperates with a respective fastener receiving bore means of said separate mounting plate.

4. The vibration exciter apparatus according to claim 3, wherein the upwardly facing surface of the upper wall and the downwardly facing surface of the lower wall include exciter casing annular ring formations cooperable with mounting plate physical formation means to relatively locate said fastener positioning locations with said fastener receiving bore means of said mounting plate.

5. The vibration exciter apparatus according to claim 4, wherein said exciter casing annular ring formations and said mounting plate physical formation means include cooperable aligning surface arrangements to ensure alignment of a fastener positioning location of said exciter casing with a respective fastener receiving bore means of said mounting plate.

6. The vibration exciter apparatus according to claim 4, wherein said fastener positioning locations are arranged in an array whereby the fastener positioning locations located at one end of the exciter casing relative to a central transverse axis form a mirror image of the fastener positioning locations at an opposed end of the exciter casing relative to the central transverse axis.

7. The vibration exciter apparatus according to claim 1, wherein the exciter casing includes an internal zone including at least one bearing means, the at least one bearing means supporting a driven shaft carrying eccentric mass means externally of said exciter casing.

8. The vibration exciter apparatus according to claim 7, wherein the internal zone of said exciter casing includes an individual sump zone liquid lubricant sump zone for the at least one bearing means.

9. The vibration exciter apparatus according to claim 8, wherein a first said bearing means carrying a said driven shaft is located in said internal zone adjacent a first end wall of the two opposed end wall portions of said exciter casing and a second said bearing means carrying a said driven shaft is located in said internal zone adjacent a second said end wall of the two opposed end wall portions, said first bearing means being located in said internal zone in a first said liquid lubricant sump zone, and said second bearing means being located in said internal zone in a second said liquid lubricant sump zone separate from said first liquid lubricant sump zone, said first liquid lubricant sump zone and said second liquid lubricant sump zone being positioned adjacent a first said side face of the exciter casing.

10. The vibration exciter apparatus according to claim 9, wherein the first driven shaft and the second driven shaft also each carry a gear, the gears intermeshing with each other, said intermeshing gear means being located in a third liquid lubricant sump zone separate from said first and said second liquid lubricant sump zones and positioned between said first and said second liquid lubricant sump zones and a second said side face of said exciter casing.

11. The vibration exciter apparatus according to claim 7, wherein the at least one bearing means includes a first bearing member and a second bearing member positioned axially along the driven shaft.

12. The vibration exciter apparatus according to claim 11, wherein said first bearing member is a toroidal roller bearing and said second bearing member is a spherical roller bearing.

13. A vibration exciter apparatus being mountable to vibration processing or handling equipment to impose, in use, a desired vibration regime to said vibration processing or handling equipment, said vibration exciter apparatus comprising:
an exciter casing having an upper wall and an opposed lower wall spaced from said upper wall, said lower wall and said upper wall being connected by two opposed mutually spaced end wall portions, said exciter casing having two spaced and opposed side faces, said exciter casing further having a plurality of spaced fastener positioning locations, each said fastener positioning location having at least a first portion positioned at or adjacent an upwardly facing surface of the upper wall of the exciter casing and a second portion aligned with said first portion located at or adjacent a downwardly facing surface of the lower wall of the exciter casing, and a plurality of elongated fastener elements each having a length to pass through said aligned first and second portions of a said fastener positioning location and being cooperable with at least some of said fastener positioning locations to, in use, mount said vibration exciter apparatus to said vibration processing or handling equipment with selectably either said upper wall or said lower wall of said exciter casing being closer to or spaced from said vibration processing or handling equipment.

14. The vibration exciter apparatus according to claim 13, wherein a each of said elongated fastener elements is engageable directly into a respective fastener positioning location.

15. A vibration exciter apparatus being mountable to vibration processing or handling equipment to impose, in use a vibration regime to processing or handling equipment, said vibration exciter apparatus comprising:
an exciter casing with an upper wall, a lower wall, opposed end walls, and opposed side faces defining an internal zone operationally supporting spaced bearing means;
spaced first and second driven shafts each being supported by a respective said bearing means, whereby an end portion of each of said first driven shaft and said second driven shaft extends beyond a side face of said exciter casing and carries an eccentric mass, said vibration exciter apparatus still further including a mounting plate separate to said exciter casing and securable, in use, to said vibration processing or handling equipment, said exciter casing having multiple spaced fastener receiving bore means extending through said exciter casing from a first end zone at or adjacent said upper wall of said exciter casing part to a second end zone at or adjacent said lower wall of said exciter casing, said mounting plate including multiple spaced fastener receiving fitting means positioned whereby a said first end zone, or a said second end zone of respective said fastener receiving bore means are alignable with a said fastener receiving fitting means in said mounting plate.

16. A vibration exciter apparatus casing for use in vibration exciter apparatus arranged to be mounted to vibration processing or handling equipment to impose, in use, a vibration regime to said vibration processing or handling equipment, said vibration exciter apparatus casing having an upper wall, a lower wall spaced from said upper wall being connected by two opposed mutually spaced end wall portions, said vibration exciter apparatus casing further having two opposed side faces, said vibration exciter apparatus casing further having a plurality of spaced fastener positioning locations, each said fastener positioning location having at least a first portion positioned at or adjacent an upwardly facing surface of the upper wall of the vibration exciter apparatus casing and at least a second portion located at or adjacent a downwardly facing surface of the lower wall of the vibration exciter apparatus casing, whereby said vibration exciter apparatus casing, when forming part of vibration exciter apparatus, is mountable to said vibration processing or handling equipment by elongated fastener members with selectably either said upwardly facing surface or said downwardly facing surface or said vibration exciter apparatus casing being closer to or spaced from said vibration processing or handling equipment.

17. The vibration exciter apparatus casing according to claim 16, wherein each said end wall has at least two spaced fastener receiving bore means each forming a said fastener positioning location.

18. The vibration exciter apparatus casing according to claim 17, wherein at least one said fastener positioning location is formed in said vibration exciter apparatus casing midway between said end wall portions.

19. The vibration exciter apparatus casing according to claim 16, wherein one or more of said fastener positioning locations includes a continuous bore passage extending from a said first portion to a said second portion.

20. The vibration exciter apparatus casing according to claim 16, wherein one or more of said fastener positioning locations includes a first fastener receiving bore extending inwardly from a said first portion and a second fastener receiving bore axially aligned with said first fastener receiving bore extending inwardly from said second portion, said first fastener receiving bore and said second fastener receiving bore being axially spaced from one another.

21. The vibration exciter apparatus casing according to claim 16, wherein the vibration exciter apparatus casing has an internal zone within the upper wall, the lower wall, and the opposed spaced end wall portions, at least one of the side faces being substantially open.

22. The vibration exciter apparatus casing according to claim 21, wherein at least one bearing mounting compartment is formed in said internal zone adjacent a first said side face portion, the at least one bearing mounting compartment being engageable, in use, with one or more bearings.

23. The vibration exciter apparatus casing according to claim 22, wherein the at least one bearing mounting compartment includes at least one liquid lubricant sump zone positioned adjacent said wall formation means.

24. The vibration exciter apparatus casing according to claim 23, wherein two said bearing mounting compartments are provided in said internal zone in side by side configuration positioned adjacent a first side face of the opposed side faces and separated by a transversely disposed intermediate wall means, said transversely disposed transversely disposed intermediate wall structure extending from said first side face providing two separated liquid lubrication sump zones.

25. The vibration exciter apparatus casing according to claim 24, wherein said two bearing mounting compartments and said transversely disposed intermediate wall structure terminate at a position internally spaced from a second side face of the opposed side faces opposed to said first side face, whereby a gearing mounting compartment is positioned in said internal zone between the at least one bearing mounting compartment(s) and the second side face.

26. A vibration exciter assembly being mountable to processing or handling equipment to impose in use a desired vibration regime to said processing or handling equipment, said vibration exciter assembly including an exciter apparatus comprising an exciter casing and a mounting plate separate from said exciter apparatus, said separate mounting plate being securable in a desired mounting position to said processing or handling equipment, said exciter apparatus having a plurality of exciter casing fastener receiving zones disposed in a first array, said mounting plate having a plurality of first mounting plate fastener receiving locations disposed in a second array, whereby at least some of said exciter casing fastener zones are alignable with at least some of said first mounting plate receiving locations whereby said exciter apparatus is securable to the mounting plate by a plurality of first fastener elements each being cooperable with a respective one of said exciter casing fastener receiving zone and a first mounting plate fastener receiving location, wherein the exciter casing includes exciter casing annular ring formations cooperable with mounting plate physical formation means to relatively locate said first array with said second array.

27. The vibration exciter assembly according to claim 26, wherein said mounting plate includes a plurality of second mounting plate fastener receiving locations disposed in a third array configured differently to said second array.

28. The vibration exciter assembly according to claim 26, wherein the exciter casing annular ring formations and the mounting plate physical formation means each include engageable alignment surfaces to align said first array with said second array as the exciter apparatus is moved towards said mounting plate.

29. A method of replacing a first vibration exciter apparatus secured by a plurality of removable first fastener elements to a first installation position on processing or handling equipment whereby, in use, said first vibration exciter apparatus imposes a vibration regime to said processing or handling equipment, said first fastener elements being engaged with first fastener receiving locations disposed in a first array in said first installation position, said method comprising the steps of:
- removing said first vibration exciter apparatus from said first installation position;
- installing an adapter mounting plate to said first installation position, said adapter mounting plate having a plurality of second fastener receiving locations in a second array being alignable with second fastener receiving locations on a second vibration exciter apparatus; and
- installing the second vibration exciter apparatus on said processing or handling equipment by utilizing second fastener elements engageable with said second vibration exciter apparatus and into a respective second fastener receiving location in said adapter mounting plate, wherein said adapter mounting plate includes a plurality of third fastener receiving locations disposed to be alignable with said first array of fastener receiving locations in said first installation position, said adapter mounting plate being securable by said first fastener elements or by third fastener elements engageable with said third fastener receiving locations and said first fastener receiving locations.

30. An adapter plate member for use in the method of claim 29, comprising a plurality of said second fastener receiving locations arranged in said second array.

31. The adapter plate member according to claim 30, wherein said adapter mounting plate further includes a plurality of third fastener receiving locations arranged to be alignable with said first array of fastener receiving locations in said first installation position, said second array and said first array being different.

32. A vibration exciter apparatus being mountable to vibration processing or handling equipment to impose in use a vibration regime to said vibration processing or handling equipment, said vibration exciter apparatus comprising an exciter casing with a lower wall, a first end wall and a second end wall respectively extending upwardly from opposed end zones of said lower wall, said lower wall and said first and said second end walls defining an internal zone of the exciter casing having an upwardly facing surface and two opposed side faces, said exciter casing further having a plurality of spaced first fastener positioning locations configured in a first array, said first fastener positioning locations permitting fastener elements to pass there through to engage with fastener engagement locations of an engagement zone of said vibration processing or handling element, said fastener engagement locations being arranged in a second array, said second array having a first end zone and a second opposed end zone, whereby when mounting said vibration exciter apparatus to said vibration processing or handling equipment, said vibration exciter apparatus is selectably rotatable about an intermediate vertical axis to position either a first end zone of said first array of fastener positioning locations or a second end zone of said first array of fastener positioning locations with a said first end zone of said second array of said fastener engagement locations whereby said fastener elements enable mounting of said vibration exciter apparatus to said vibration handling or processing equipment.

33. The vibration exciter apparatus according to claim 32, wherein each of said first positioning locations has a first end zone positioned adjacent said upwardly facing surface and a second end zone positioned adjacent base lower wall.

34. The vibration exciter apparatus according to claim 32, wherein said engagement zone is part of said vibration processing or handling equipment.

35. The vibration exciter apparatus according to claim 32, wherein said engagement zone is formed by a mounting plate separate from said vibration exciter apparatus, said mounting plate being secured to or securable to said vibration processing or handling equipment.

* * * * *